(12) United States Patent
Daubenspeck et al.

(10) Patent No.: US 11,111,053 B2
(45) Date of Patent: *Sep. 7, 2021

(54) STACKABLE HALF-SIZE RECONFIGURABLE PALLET/DOLLY PLATFORM

(71) Applicant: CHEP TECHNOLOGY PTY LIMITED, Sydney (AU)

(72) Inventors: Bradley Wayne Daubenspeck, Windermere, FL (US); Daniel Aaron Gorsky, Lebanon, OH (US); Craig Rolland Norman, Cumming, GA (US)

(73) Assignee: CHEP Technology Pty Limited, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 16/674,076

(22) Filed: Nov. 5, 2019

(65) Prior Publication Data
US 2020/0148414 A1 May 14, 2020

Related U.S. Application Data

(60) Provisional application No. 62/760,218, filed on Nov. 13, 2018.

(51) Int. Cl.
*B65D 19/42* (2006.01)
*B65D 19/00* (2006.01)
(Continued)

(52) U.S. Cl.
CPC ............ *B65D 19/0048* (2013.01); *B62B 3/16* (2013.01); *B62B 5/0093* (2013.01);
(Continued)

(58) Field of Classification Search
CPC ........... B65D 19/0048; B65D 19/0012; B65D 19/38; B65D 19/42; B65D 2519/00034;
(Continued)

(56) References Cited

U.S. PATENT DOCUMENTS 4,051,787 A * 10/1977 Nishitani ........... B65D 19/0012
108/55.3
4,397,246 A * 8/1983 Ishida ................ B65D 19/0012
108/55.3
(Continued)

FOREIGN PATENT DOCUMENTS

CA 3011795 * 8/2017
DE 633273 7/1936
(Continued)

*Primary Examiner* — Janet M Wilkens
(74) *Attorney, Agent, or Firm* — Allen, Dyer, Doppelt + Gilchrist, PA

(57) ABSTRACT

A reconfigurable pallet/dolly platform includes a top deck having a product support surface and an opposing underside. The product support surface has grommet openings extending therethrough. The underside includes pallet support leg attachment areas aligned with the grommet openings for receiving pallet support legs when configured as a pallet. Also, the underside includes dolly wheel attachment areas for receiving dolly wheels when configured as a dolly. The product support surface includes grommets inserted into the grommet openings. Each grommet includes an upper section that extends in height above the top deck to engage an underside of the pallet support legs from an identical platform stacked thereon when configured as a pallet. Also, the product support surface includes dolly wheel receiving areas aligned with the dolly wheel wells on the underside, and engage the dolly wheels from an identical platform stacked thereon when configured as a dolly.

20 Claims, 29 Drawing Sheets

(51) Int. Cl.
*B65D 19/38* (2006.01)
*B62B 3/16* (2006.01)
*B62B 5/00* (2006.01)

(52) U.S. Cl.
CPC ......... *B65D 19/0012* (2013.01); *B65D 19/38* (2013.01); *B65D 19/42* (2013.01); B65D 2519/00034 (2013.01); B65D 2519/00069 (2013.01); B65D 2519/0084 (2013.01); B65D 2519/0096 (2013.01); B65D 2519/00129 (2013.01); B65D 2519/00273 (2013.01); B65D 2519/00308 (2013.01); B65D 2519/00333 (2013.01); B65D 2519/00338 (2013.01); B65D 2519/00567 (2013.01); B65D 2519/00756 (2013.01); B65D 2519/00781 (2013.01); B65D 2519/00815 (2013.01); B65D 2519/00955 (2013.01)

(58) Field of Classification Search
CPC ........... B65D 2519/00069; B65D 2519/00129; B65D 2519/00273; B65D 2519/00308; B65D 2519/00333; B65D 19/0073; B65D 19/0038; B65D 19/0026; B65D 19/0004; B65D 19/06; B65D 19/20; B65D 2519/00338; B65D 2519/00567; B65D 2519/00756; B65D 2519/00781; B65D 2519/00815; B65D 2519/0084; B65D 2519/00955; B65D 2519/0096; B65D 2519/00288; B65D 2519/00323; B65D 2519/00771; B65D 2519/00572; B65D 2519/00407; B62B 5/0092; B62B 3/16
USPC ...... 108/51.11, 901, 902, 57.29, 57.25, 51.3, 108/57.17, 57.19, 57.33, 55.1, 53.1; 206/386, 595–600
See application file for complete search history.

(56) References Cited

U.S. PATENT DOCUMENTS

| | | | | |
|---|---|---|---|---|
| 4,398,653 | A * | 8/1983 | Daloisio | B65D 90/205 108/53.1 |
| 4,735,154 | A | 4/1988 | Hemery | |
| 5,483,899 | A | 1/1996 | Christie | |
| 5,556,118 | A * | 9/1996 | Kern | B62B 3/008 280/47.16 |
| 6,109,190 | A | 8/2000 | Hale et al. | |
| 6,173,659 | B1 | 1/2001 | Danks et al. | |
| 6,199,488 | B1 | 3/2001 | Favaron et al. | |
| 6,216,608 | B1 * | 4/2001 | Woods | B65D 19/0012 108/56.1 |
| 6,357,366 | B1 * | 3/2002 | Frankenberg | B65D 19/0026 108/57.25 |
| 6,607,199 | B2 | 8/2003 | Gruber | |
| 6,622,641 | B2 | 9/2003 | Smyers | |
| 6,805,061 | B2 | 10/2004 | Smyers et al. | |
| 6,857,377 | B2 | 2/2005 | Herring | |
| 6,886,787 | B2 | 5/2005 | Stahl | |
| 6,974,140 | B2 | 12/2005 | Neuman | |
| 6,976,437 | B2 | 12/2005 | Fisch | |
| 6,979,005 | B1 | 12/2005 | McLerran | |
| 7,373,757 | B2 | 5/2008 | Hampel | |
| 8,006,985 | B2 * | 8/2011 | Facey | B62B 5/0093 280/43.14 |
| 8,739,706 | B2 | 6/2014 | Dubois et al. | |
| 8,740,228 | B2 | 6/2014 | Patterson et al. | |
| 8,770,115 | B2 | 7/2014 | Apps et al. | |
| 8,888,109 | B2 * | 11/2014 | Stubbs | B65D 19/42 280/30 |
| 8,950,342 | B2 | 2/2015 | Plattner | |
| 9,045,253 | B2 * | 6/2015 | Hacko | B62B 5/0433 |
| 9,061,693 | B2 | 6/2015 | Hassell | |
| 9,260,218 | B2 | 2/2016 | Lundius | |
| 9,376,234 | B2 | 6/2016 | Linares | |
| 9,387,953 | B2 * | 7/2016 | Takyar | B65D 19/40 |
| 9,611,071 | B2 | 4/2017 | Baltz et al. | |
| 10,005,586 | B1 * | 6/2018 | Miller | B65D 19/0095 |
| 10,017,296 | B2 | 7/2018 | Burk | |
| 10,099,814 | B2 | 10/2018 | Burk | |
| 10,494,141 | B2 * | 12/2019 | Wood | B65D 19/385 |
| 10,589,897 | B1 * | 3/2020 | Shawaf | B65D 19/0073 |
| 2003/0209171 | A1 | 11/2003 | Milles | |
| 2005/0193927 | A1 | 9/2005 | Herring et al. | |
| 2005/0268824 | A1 | 12/2005 | Williams | |
| 2006/0272556 | A1 * | 12/2006 | Apps | B65D 19/44 108/53.1 |
| 2007/0017420 | A1 * | 1/2007 | Hadar | B65D 19/0048 108/54.1 |
| 2007/0028814 | A1 * | 2/2007 | Swistak | B65D 19/0004 108/51.11 |
| 2007/0062420 | A1 | 3/2007 | Apps et al. | |
| 2007/0186827 | A1 * | 8/2007 | Loftus | B65D 19/42 108/57.15 |
| 2007/0215014 | A1 | 9/2007 | Lee | |
| 2009/0064906 | A1 * | 3/2009 | Cance | B65D 19/0038 108/56.3 |
| 2011/0259249 | A1 | 10/2011 | Ogburn et al. | |
| 2012/0325125 | A1 | 12/2012 | Apps et al. | |
| 2013/0174762 | A1 | 7/2013 | Hedley et al. | |
| 2014/0033956 | A1 * | 2/2014 | Kelly | B62B 5/049 108/50.11 |
| 2014/0366783 | A1 * | 12/2014 | Kosonen | B65D 19/0002 108/51.11 |
| 2016/0167831 | A1 | 6/2016 | Suiter et al. | |
| 2017/0096255 | A1 | 4/2017 | Nottestad et al. | |
| 2019/0055055 | A1 * | 2/2019 | Wood | B62B 5/0093 |
| 2019/0328159 | A1 * | 10/2019 | Marivoet | A47B 43/00 |
| 2019/0359378 | A1 * | 11/2019 | White | B65D 19/0073 |
| 2019/0367214 | A1 * | 12/2019 | D'Emidio | B65D 19/0016 |
| 2020/0002053 | A1 * | 1/2020 | Zhang | B65D 19/18 |
| 2020/0031522 | A1 * | 1/2020 | Shawaf | B29C 41/04 |
| 2020/0148412 | A1 * | 5/2020 | Daubenspeck | B65D 19/0026 |
| 2020/0148414 | A1 * | 5/2020 | Daubenspeck | B65D 19/0026 |
| 2020/0148416 | A1 * | 5/2020 | Daubenspeck | B65D 19/0048 |
| 2020/0148417 | A1 * | 5/2020 | Daubenspeck | B65D 19/0026 |

FOREIGN PATENT DOCUMENTS

| | | | |
|---|---|---|---|
| DE | 8310685 | | 7/1983 |
| DE | 4324216 | | 1/1994 |
| EP | 1911681 | * | 4/2008 |
| EP | 2228312 | | 9/2010 |
| EP | 2722285 | | 4/2014 |
| EP | 3050816 | * | 8/2016 |
| FR | 2544287 | | 10/1984 |
| GB | 1583763 | | 2/1981 |
| GB | 2521965 | * | 7/2016 |
| JP | H0664649 | | 8/1994 |
| JP | 2000229636 | | 8/2000 |
| JP | 2005263261 | | 9/2005 |
| JP | 2008308190 | | 12/2008 |
| JP | 2010116194 | | 5/2010 |
| WO | 2006137320 | * | 12/2006 |
| WO | WO2007144660 | | 12/2007 |
| WO | WO2008054219 | | 5/2008 |
| WO | WO2013159796 | | 10/2013 |
| WO | WO2019231883 | | 12/2019 |

* cited by examiner

STACKABLE HALF-SIZE RECONFIGURABLE PALLET/DOLLY PLATFORM

RELATED APPLICATION

This application claims the benefit of provisional application Ser. No. 62/760,218 filed Nov. 13, 2018, which is hereby incorporated herein in its entirety by reference.

TECHNICAL FIELD

The present disclosure relates to the field of pallets, and more particularly, to a half-size reconfigurable pallet/dolly platform.

BACKGROUND

Retail stores often prefer the use of fractional pallets when displaying products that are for customer purchase. Fractional pallets are typically one-quarter to one-half the size of full size pallets. Fractional pallets have a significantly smaller footprint, which allows retail stores to display a greater variety of products within the same size area as full size pallets.

In addition, retail stores often prefer the use of fractional plastic pallets instead of fractional wood pallets. Fractional plastic pallets are more aesthetically pleasing than fractional wood pallets, as well as being more sanitary.

Even in view of current fractional plastic pallets, there is still a need for a fractional plastic pallet that can be easily moved by pallet handling equipment and can enable product display that is aesthetically acceptable. Since the products to be carried by the fractional plastic pallet at times may be relatively heavy, the load carrying capacity of the pallet should not be sacrificed while also providing accessibility.

SUMMARY

A reconfigurable pallet/dolly platform includes a top deck including a product support surface and an opposing underside. The product support surface includes grommet openings extending therethrough, with each grommet opening including a recessed shelf. The underside includes pallet support leg attachment areas aligned with the grommet openings for receiving pallet support legs when configured as a pallet, and dolly wheel attachment areas for receiving dolly wheels when configured as a dolly. The product support surface includes grommets inserted into the grommet openings. Each grommet includes an upper section comprising an upper lip resting on the recessed shelf, and an outer exposed surface of the upper section extending in height above the top deck to engage an underside of the pallet support legs from an identical platform stacked thereon when configured as a pallet. The product support surface further includes dolly wheel receiving areas aligned with the dolly wheel wells to engage the dolly wheels from an identical platform stacked thereon when configured as a dolly.

The underside of each pallet support leg includes grommet openings, with each grommet opening configured to receive the upper section of a respective grommet of the identical pallet when stacked thereon.

The upper section of each grommet includes an upper surface, with a transition between the upper surface and the upper lip being curved.

The grommet openings may be positioned at opposing ends of the top deck, with each opposing end having a pair of spaced apart grommet openings with a pair of grommets inserted therein. Each pallet support leg may include a base extending across a width of the top deck, and a pair of outer base support elements. Each outer base support element has a lower end integrally formed with an end of the base, and an upper end coupled to the underside of the top deck. An underside of the base is configured to engage the upper sections of a pair of grommets of an identical pallet when stacked thereon.

Each pallet support leg may further include a center base support element having a lower end integrally formed with the base, and an upper end coupled to the underside of the top deck. Each pair of spaced apart grommet openings include a respective grommet opening between the center base support element and each outer base support element.

Each grommet may further include at least one mid-section adjacent the upper lip and extending from the upper section to an underside of the top deck. At least one lower section may extend from the at least one mid-section, and includes a pair of spaced apart lower lips resting on the underside of the top deck. An outer exposed surface of the at least one lower section extends in height below the underside of the top deck.

Each grommet opening may further include a divider, wherein the at least one mid-section may include a pair of spaced apart mid-sections. Each mid-section may be separated by the divider, and wherein the at least one lower section may include a pair of lower sections. Each lower section extends from a respective mid-section.

The divider may include a lower surface even with the underside of the top deck. The divider may include an upper surface that is below the recessed shelf. The top deck and the pallet support legs comprise plastic.

Another aspect is directed to a method for making a reconfigurable pallet/dolly platform as described above. The method includes forming a top deck including a product support surface and an opposing underside. The product support surface has grommet openings extending therethrough. Each grommet opening includes a recessed shelf. The underside includes pallet support leg attachment areas aligned with the grommet openings for receiving pallet support legs when configured as a pallet, and dolly wheel attachment areas for receiving dolly wheels when configured as a dolly. The product support surface includes grommets inserted into the grommet openings. Each grommet includes an upper section comprising an upper lip resting on the recessed shelf. An outer exposed surface of the upper section extends in height above the top deck to engage an underside of the pallet support legs from an identical platform stacked thereon when configured as a pallet. The product support surface also includes dolly wheel receiving areas aligned with the dolly wheel wells to engage the dolly wheels from an identical platform stacked thereon when configured as a dolly.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
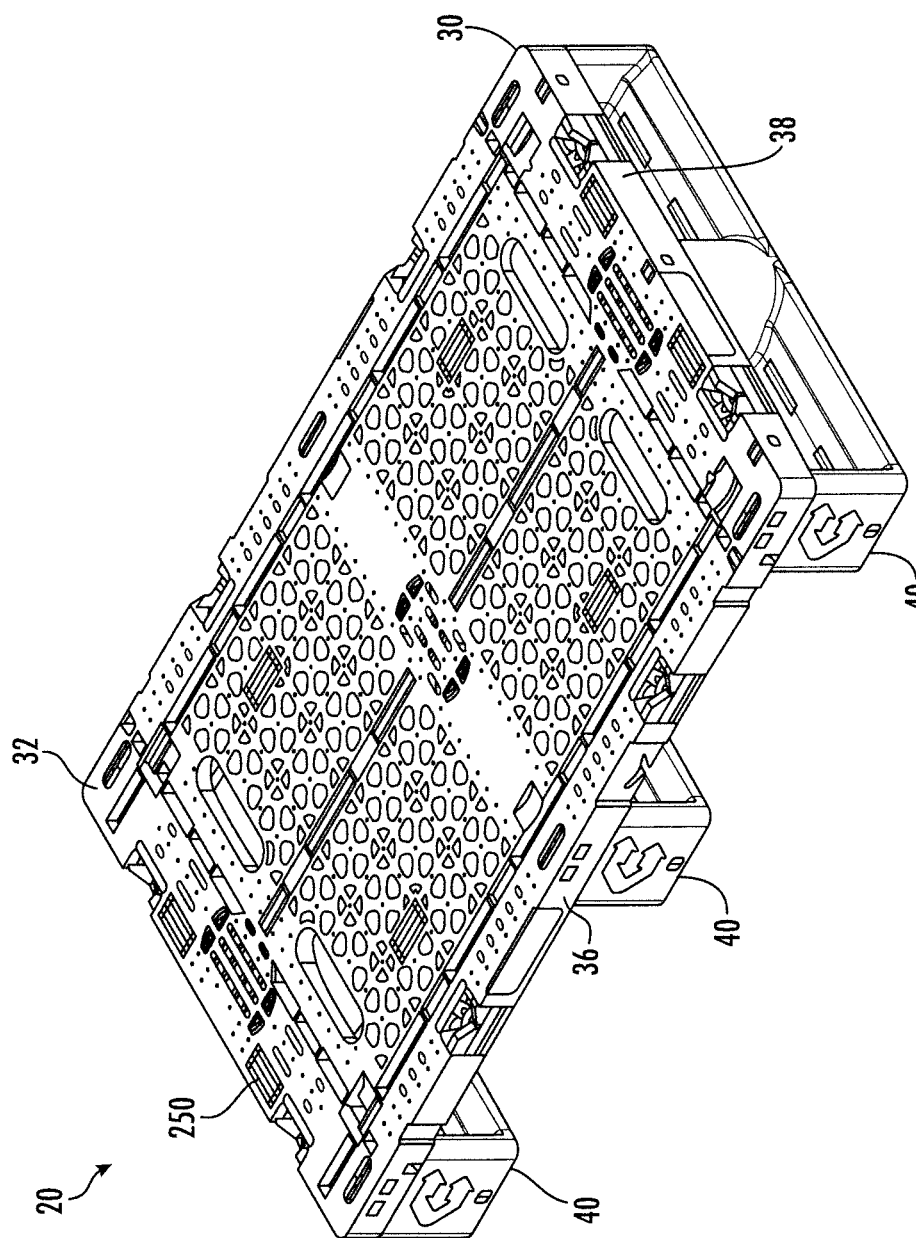
FIG. 1 is an upper perspective view of a half-size plastic pallet in accordance with the disclosure.
Figure 2:
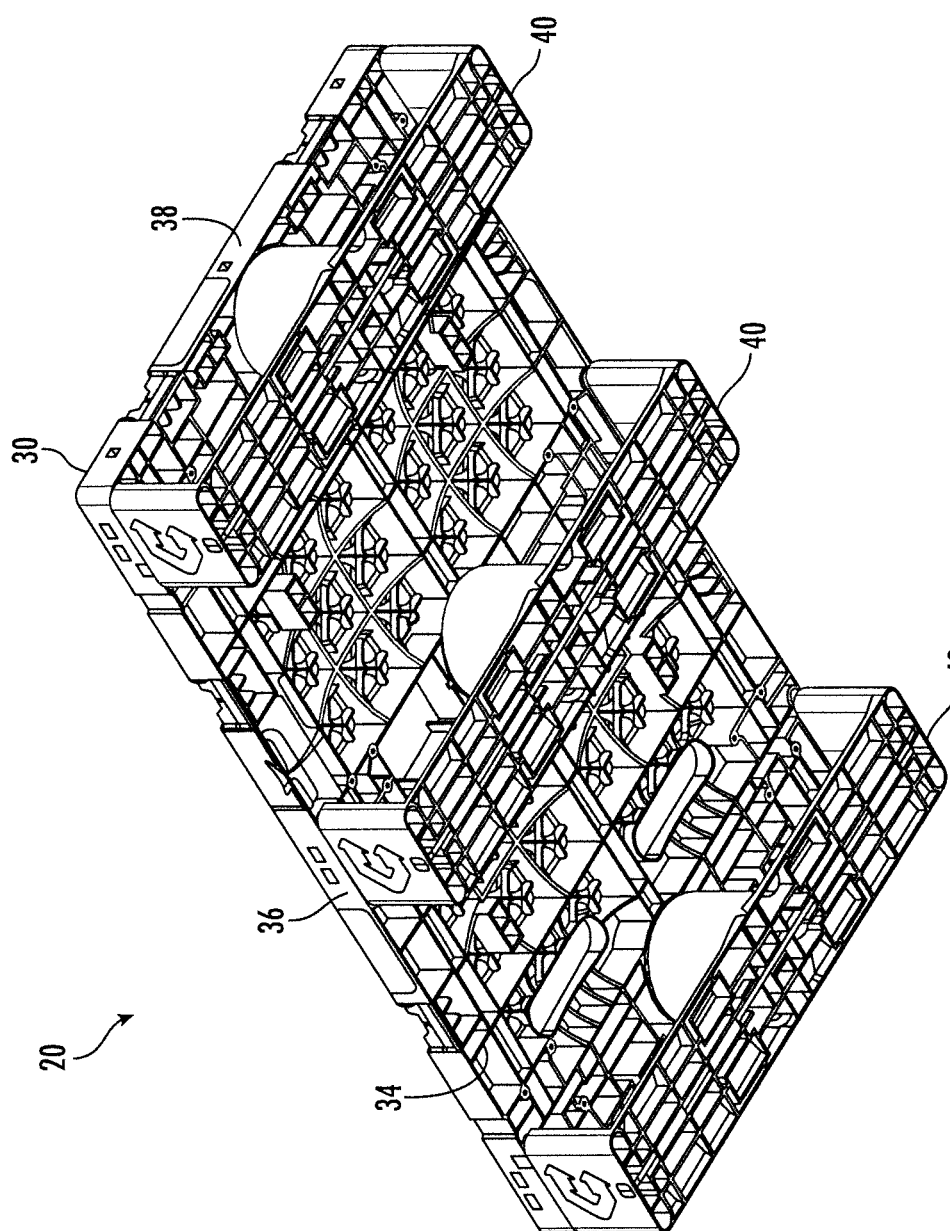
FIG. 2 is a lower perspective view of the half-size plastic pallet shown in FIG. 1.
Figure 3:
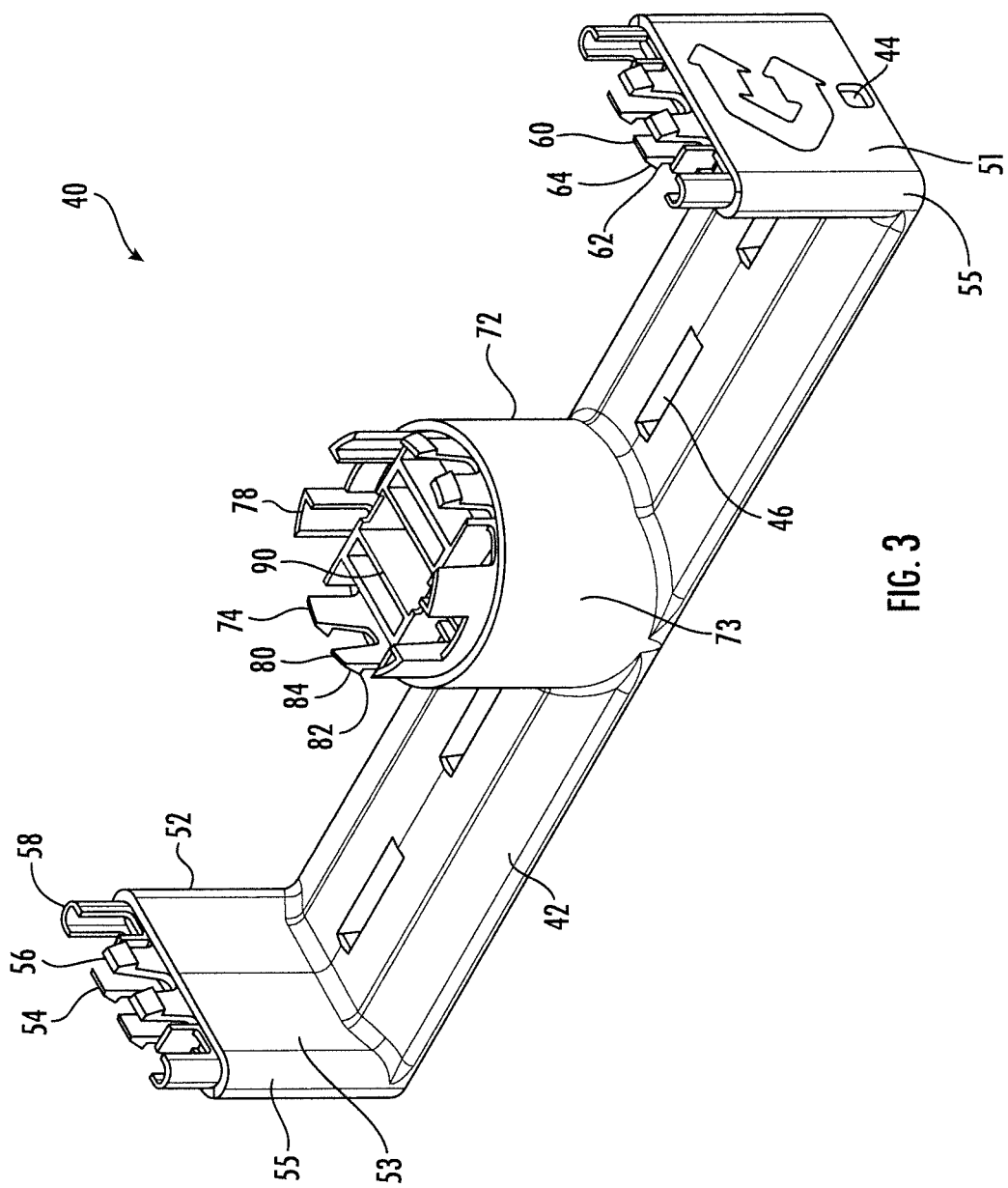
FIG. 3 is an upper perspective view of a pallet support leg for the half-size plastic pallet shown in FIGS. 1 and 2.
Figure 4:
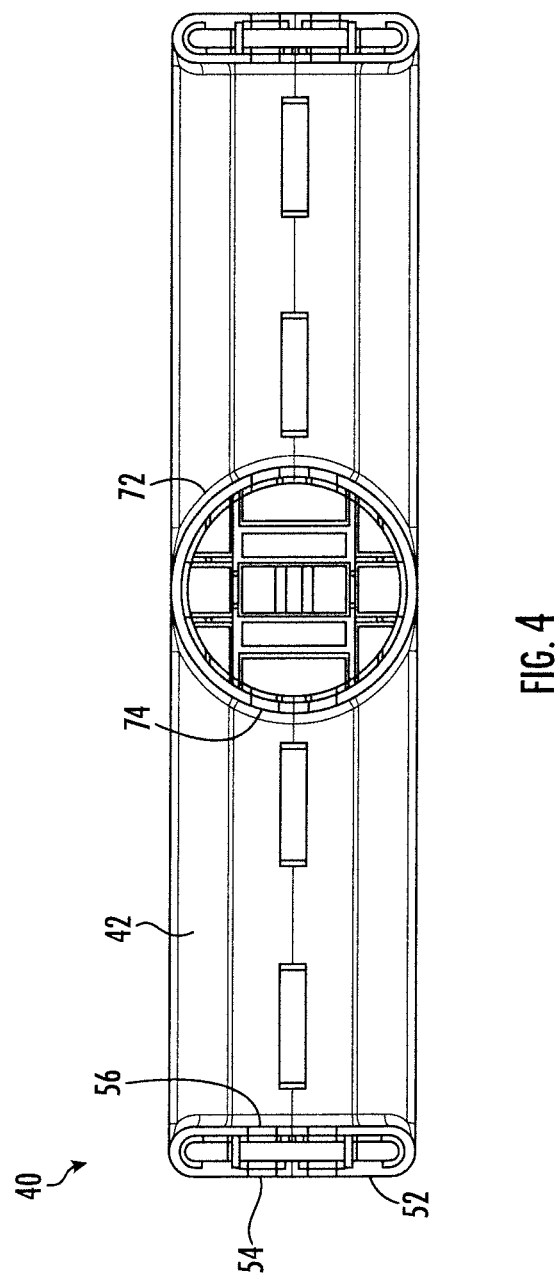
FIG. 4 is a top view of the pallet support leg shown in FIGS. 1 and 2.

Referring initially to FIGS. 1 and 2, the illustrated half-size plastic pallet 20 includes a top deck 30, and removable three pallet support legs 40 coupled to the top deck. With the pallet support legs 40 being removable from the top deck 30, this allows the half-size plastic pallet to be easily repaired should a pallet support leg 40 or the top deck 30 becomes damaged.

The three pallet support legs 40 include a pair of outer pallet support legs and a center palter support leg. The pallet support legs 40 are configured to enable four-way entry by pallet handling equipment, such as a forklift or a pallet jack. As will be discussed in detail below, the plastic pallet 20 is repairable, stackable and includes product display attachment points.

The half-size plastic pallet 20 is 24 inches by 40 inches. Even though the disclosed features of the plastic pallet 20 are directed to a half-size pallet, these features may be used on other size plastic pallets. The size of the plastic pallet 20 may be reduced to quarter-size, for example, which is 24 inches by 20 inches. The size of the plastic pallet 20 may even be increased to full-size, which is 48 inches by 40 inches. These dimensions may be adjusted to accommodate countries that use the metric system.

The top deck 30 includes an upper surface referred to as a product support surface 32, and an opposing lower surface referred to as an underside 34. The top deck 30 has outer exposed sides extending between the product support surface 32 and the opposing underside 34. The outer exposed sides include spaced apart outer sides 36 and spaced apart outer sides 38. Outer sides 36 correspond to a length of the half-size plastic pallet 20, and outer sides 38 correspond to a width or end of the half-size plastic pallet 20. The length is the longer dimension (i.e., 40 inches) of the half-size plastic pallet 20, whereas the width is the shorter dimension (i.e., 24 inches) of the half-size plastic pallet 20.

The outer pallet support legs 40 are aligned with outer sides 38. That is, the outer sides 38 are parallel to the pallet support legs 40. Each pallet support leg 40 has a length that is the same as the dimensions of outer sides 38. That is, each pallet support leg 40 extends across a width of the half-size plastic pallet 20.

Referring now to FIGS. 3-6, each pallet support leg 40 includes a base 42, and base support elements 52, 72 extending from the base 42. The base support elements 52, 72 are coupled to the underside 34 of the top deck 30. Base support element 52 may be referred to as an outer base support element, whereas base support element 72 may be referred to as a center base support element. The outer and center base support elements 52, 72 are monolithically formed with the base 42.

Each outer base support element 52 has a lower end integrally formed with the base 42, and an exposed upper end. A pair of outwardly facing snaps 54 extend from the exposed upper end to contact the underside 34 of the top deck 20. Similarly, a pair of inwardly facing snaps 56 extend from the exposed upper end to contact the underside 34 of the top deck 20. The snaps 54, 56 are configured to engage snap openings 170 in the underside 34 of the top deck 30 so that the outer base support elements 52 are coupled to the top deck 30.

The underside 34 of the top deck 30 further has a plurality of guide openings 172 adjacent the plurality of snap openings 170. Also extending from the exposed upper end of the outer base support element 52 is a pair of spaced apart guides 58. The guides 58 are configured to align the snaps 54, 56 with the snap openings 170. The guide openings 172 correspond to a profile or outline of the outer base support element 52 that is defined by the outwardly facing side wall 51, the inwardly facing side wall 53 and the pair of curved end walls 55. Dimensions of the guide openings 172 in the underside 34 of the top deck 30 are less than dimensions of the profile or outline of the outer base support element 52 so as to receive the guides 58.

Figure 10:
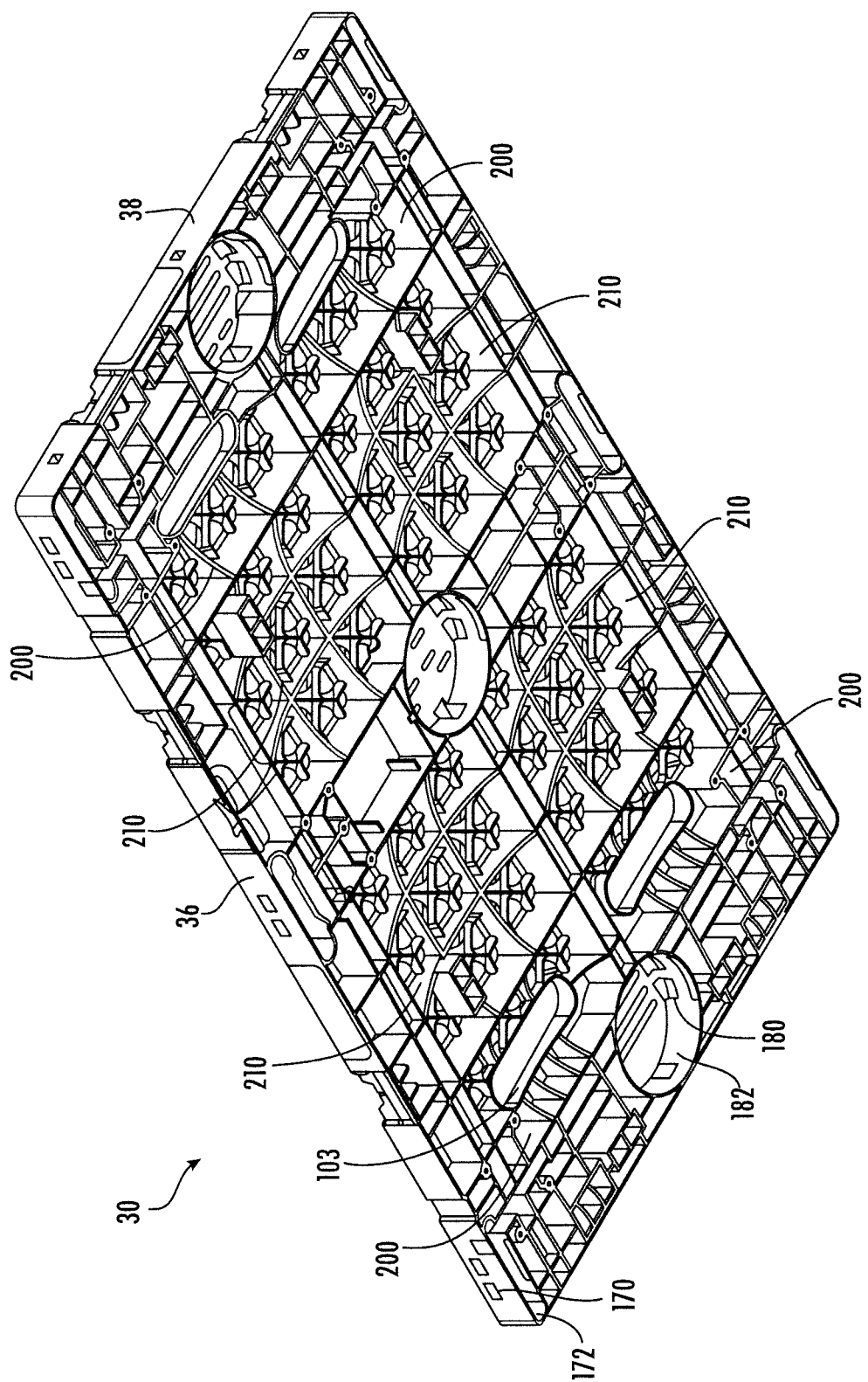
FIG. 10 is a bottom perspective view of the top deck shown in FIG. 7.

As illustrated in FIG. 10, the snap openings 170 for the outwardly facing snaps 54 are directed outwards so that they are exposed by the outer sides 36 of the top deck 30, whereas the snap openings 170 for the inwardly facing snaps 56 are directed inwards and are not exposed. A height of the guides 58 may be the same as a height of the snaps 54, 56. In other embodiments, the height of the guides 58 may be different than the height of the snaps 54, 56.

The outer base support element 52 has an outwardly facing side wall 51 with the pair of outwardly facing snaps 54 extending therefrom, and a spaced apart inwardly facing side wall 53 with the pair of inwardly facing snaps 56 extending therefrom. The pair of outwardly facing snaps 54 are recessed from the outwardly facing side wall 51. The pair of inwardly facing snaps 56 are recessed from the inwardly facing side wall 53.

A pair of curved end walls 55 is at the ends of the outwardly and inwardly facing side walls 51 and 53, with the pair of guides 58 extending from the pair of curved end walls 55. A portion of each guide 58 is curved corresponding to curvature of the curved end walls 55. The pair of guides 58 are recessed from the pair of curved end walls 55.

Each snap 54, 56 includes a flexible snap element 60, a lip 62 extending outwards from the snap element 60, and an angled face or edge 64 between the lip 62 and the snap element 60. The angled face 64 and lip 62 flexible engage a corresponding snap opening 170 in the underside 34 of the top deck 30.

The center base support element 72 has a lower end integrally formed with the base 42, and an exposed upper end. Two pairs of outwardly facing snaps 74 extend from the exposed upper end to contact the underside 34 of the top deck 20. The snaps 74 are configured to engage snap openings 180 in the underside 34 of the top deck 30. As illustrated in FIG. 10, the snap openings 180 for the outwardly facing snaps 74 are in the underside 34 of the top deck 30 and are not exposed by either of the outer sides 36, 38.

The underside 34 of the top deck 30 further has a plurality of guide openings 182 adjacent the plurality of snap openings 182. Also extending from the exposed upper end of the center base support element 72 are two pairs of spaced apart guides 78. The guides 78 are configured to align the snaps 74 with the snap openings 180 in the underside 34 of the top deck 30. The guide openings 182 correspond to a profile or outline of the center base support element 72 that is defined by wall 73. Dimensions of the guide openings 182 in the underside 34 of the top deck 30 are less than dimensions of the profile or outline of the center base support element 72 so as to receive the guides 78.

The center base support element 72 is circular-shaped. The two pairs of snaps 74 extend from the circular-shaped wall 73, and the guides 78 and the snaps 74 are recessed from the circular-shaped wall 73. The guides 78 and the snaps 74 are curved to match the curvature of the circular-shaped wall 73. A height of the guides 78 may be the same as a height of the snaps 74. In other embodiments, the height of the guides 78 may be different than the height of the snaps 74.

Each snap 74 includes a flexible snap element 80, a lip 82 extending outwards from the snap element 80, and an angled face or edge 84 between the lip 82 and the snap element 80. The angled face 84 and lip 82 flexible engage a corresponding snap opening 180 in the underside 34 of the top deck 30.

The center base support element 72 further includes a core section 90 that is ribbed. In addition, the core section 90 also extends from the exposed upper end. A height of the core section 90 is less than a height of the snaps 74.

Figure 6:
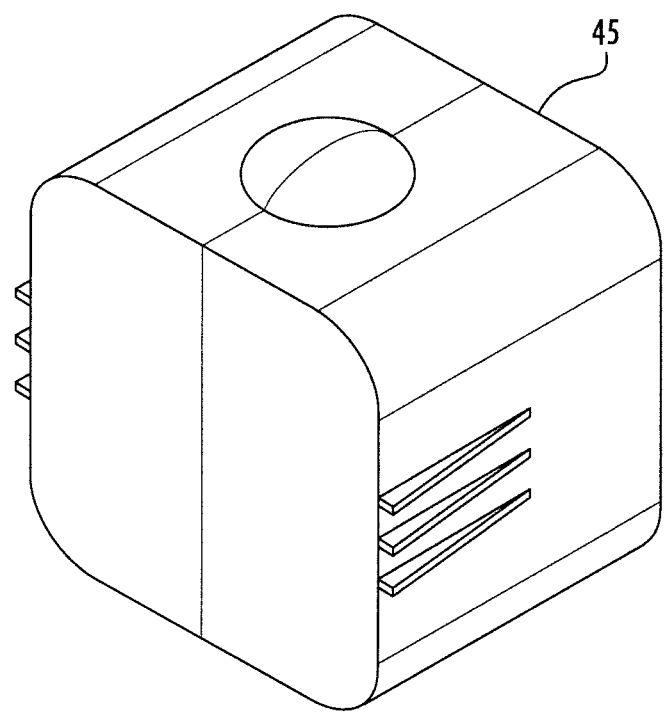
FIG. 6 is a perspective view of a plug that is inserted into a reinforcement bar opening for the pallet support leg shown in FIG. 3.

Each pallet support leg 40 is identical to one another. The base 42 in each pallet support leg 40 includes an opening 44 for receiving a reinforcement bar. A reinforcement bar adds strength and durability to the pallet support leg 40. The reinforcement bar may be, but is not limited to, steel or metal, for example. The base 42 includes spaced apart openings 46 that expose the reinforcement bar. After a reinforcement bar has been inserted into an opening 44, a plug 45 as shown in FIG. 6 is inserted into the opening 44 to retain the reinforcement bar therein. The opening 44 may be sized to receive a half ½ inch or ⅝ inch plug 45, for example.

Each pallet support legs 40 may be formed with a thermoplastic or polymer material. Similarly, the top deck 30 may also be formed with a thermoplastic or polymer material. The plastic used in the half-size plastic pallet 20 may be recyclable.

Another aspect is directed to a method for making a pallet 20 with removable pallet support legs 40 as described above. The method includes forming a top deck 30 with a product support surface 32 and an opposing underside 34, with the underside 34 having a plurality of snaps openings 170 therein. The method further includes forming a plurality of pallet support legs 40. Each pallet support leg 40 includes a base 42 extending across a width of the top deck 30, and a pair of outer base support elements 52. Each outer base support element 52 has a lower end integrally formed with an end of the base 42 and an exposed upper end. A pair of outwardly facing snaps 54 extend from the exposed upper end of each outer base support element 50 to contact the underside 34 of the top deck 30. A pair of inwardly facing snaps 56 extend from the exposed upper end of each outer base support element 50 to contact the underside 34 of the top deck 30. The method further includes engaging the pair of outwardly and inwardly facing snaps 54, 56 with respective snap openings 170 in the underside 34 of the top deck 30 so that the pallet support legs 40 are coupled to the top deck 30.

The top deck 30 will now be discussed in greater detail in reference to FIGS. 7-9. The top deck 30 is formed as one piece, and includes four quadrants 100(1)-100(4). Each quadrant may be generally referenced as quadrant 100. The quadrants 100 are symmetrical in design with the exception of shrink wrap gripping members 110 only in quadrants 100(1) and 100(3).

The shrink wrap gripping members 110 are used in the application and retention of shrink wrap over a product being carried by the top deck 30. Shrink wrap is commonly used to secure a product to a pallet. This is often an alternative to banding, although both can be applied if desired.

A problem encountered in applying shrink wrap to a pallet is in securing the ends of the shrink wrap. This problem is encountered both at the start and the finish of shrink wrapping since the wrap might not want to adhere to the product or the pallet, or may fail to retain itself against the product of the pallet at the end.

The shrink wrap gripping members 110 are positioned along the sides 36 of the top deck 30. There is one shrink wrap gripping member 110 on each side 36, i.e., quadrants 100(1) and 100(3). In other embodiments, quadrants 100(2) and 100(4) may also include a shrink wrap gripping member 110 so that all of the quadrants 100 are symmetrical in design.

Each shrink wrap gripping member 110 takes the form of a two-sided groove, similar to the shape of an anvil. The two-sided groove has a front recess and a rear recess and a narrowed opening there between. The narrowed opening allows the shrink wrap to be located into the groove, but makes it harder for it to come out again. The wrap can be pulled into either the front or rear recesses and can secure an end of the wrap either at the start or at the end of the wrapping process.

Another feature of the top deck 30 is to include grooves 150 for use as a banding strap locator. A pair of grooves 150 is located on each of the longer sides 36 of the top deck 30.

Each quadrant 100 includes a hand access hole 102. The hand access hole 102 provides an easy means for an operator to handle the half-size plastic pallet 20. The hand access hole 102 is sized large enough for a user to insert all four fingers therethrough. By providing a hand access hole 102 in each quadrant 100, the half-size plastic pallet 20 can very easily be grasped by the user for carrying it or for unloading it from a stack of pallets.

The top deck 30 includes a number of different product display attachment points for securing a product display or box to the half-size plastic pallet 20. When the half-size plastic pallet 20 is on the floor within a store with products thereon, for example, a product display helps to promote the products. U.S. Pat. No. 9,387,953 discloses a fractional plastic pallet with product display attachment points, and is incorporated herein by reference in its entirety. The '953 patent is assigned to the current assignee of the present invention.

Figure 9:
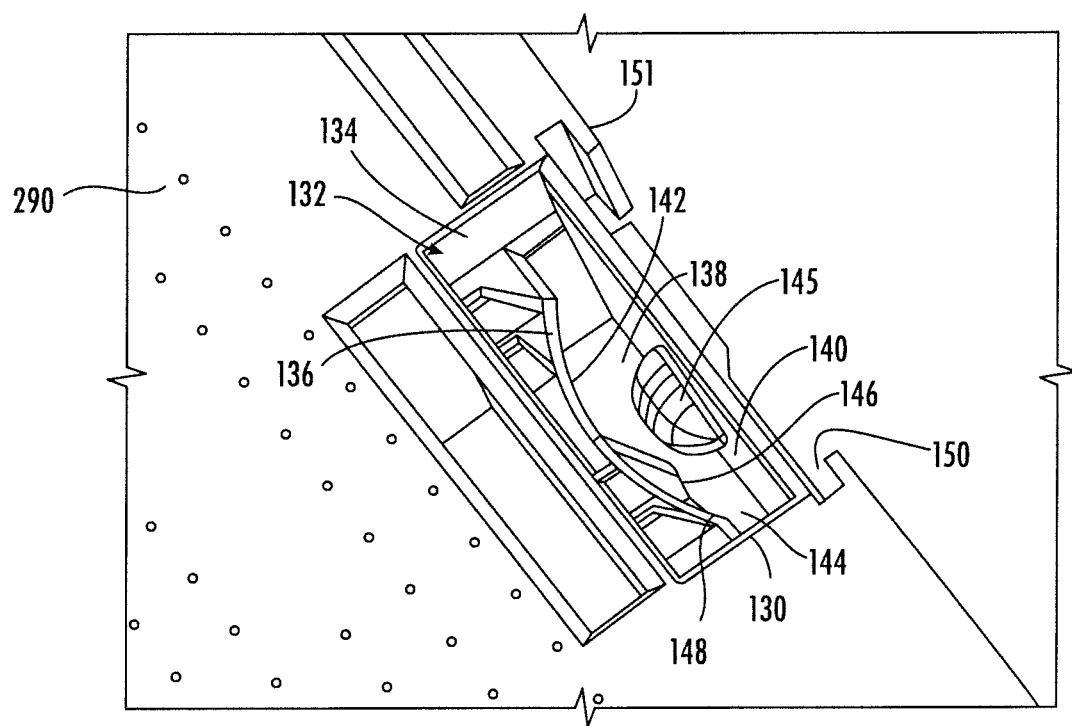
FIG. 9 is an upper perspective view of one of the product display attachment points shown in FIG. 7.

Product display attachment points include display attachment slots 120, 130 and 150 in the product support surface 32 as illustrated in FIG. 9. Each display attachment slot 120, 130 and 150 is rectangular shaped and is sized to receive a tab descending from the base of a product display so as to allow the product display to be held in place on the half-size plastic pallet 20.

A pair of display attachment slots 120 is located adjacent each side 36, 38 of the top deck 30, for a total of eight display attachment slots 120. There are also eight display attachment slots 130 and eight display attachment slots 150 in the product support surface 32. Each display attachment slot 130 is aligned with a respective display attachment slot 120, and each display attachment slot 150 is recessed from a side 36, 38 of the top deck 30 and also aligned with a respective display attachment slot 130.

Still referring to FIG. 9, each display attachment slot 130 includes an outer slot 132 within the top deck 30 and an inner slot 138 recessed within the outer slot. The outer slot 132 includes sides 134 and a partially closed bottom 136 forming a curved shelf. The inner slot 138 is adjacent the curved shelf 136 and is recessed below the outer slot 132. The inner slot 138 has a pair of spaced apart sidewalls 140 and 142, and a closed bottom 144.

Within the inner slot 132, sidewall 140 includes a projection 145 extending therefrom, and the opposing sidewall 142 includes a tapered member 146 extending therefrom. The tapered member 146 has a downwards taper towards the projection 145. If the product display tab has an appropriately positioned hole, that hole can engage and lock onto the projection 145 or the tapered member 146.

The sidewall 142 with the tapered member 146 is curved corresponding to the curved shelf 136, whereas the sidewall 140 with the projection 145 is not curved. The tapered member 146 includes a lowermost surface 148 that is perpendicular to the closed bottom 144 of the inner slot 138. There is a gap between the flat underside 148 and the closed bottom 144. The projection 145 has a quarter-spherical shape, for example. The tapered member 146 is aligned with a center of the projection 145.

Each display attachment slot 150 is recessed from a side 36, 38 of the top deck 30. A significant portion of the corresponding sides 36, 38 of the top deck 30 is removed so as to expose the display attachment slot 150. Removal of the corresponding sides 36, 38 for the display attachment slots 150 is uniform so as to form a pair of spaced apart retention tabs 151 for securing a product display tab. The retention tabs 151 are at an upper portion of the display attachment slot 150, while the lower portion of the display attachment slot 150 is fully exposed.

Figure 7:
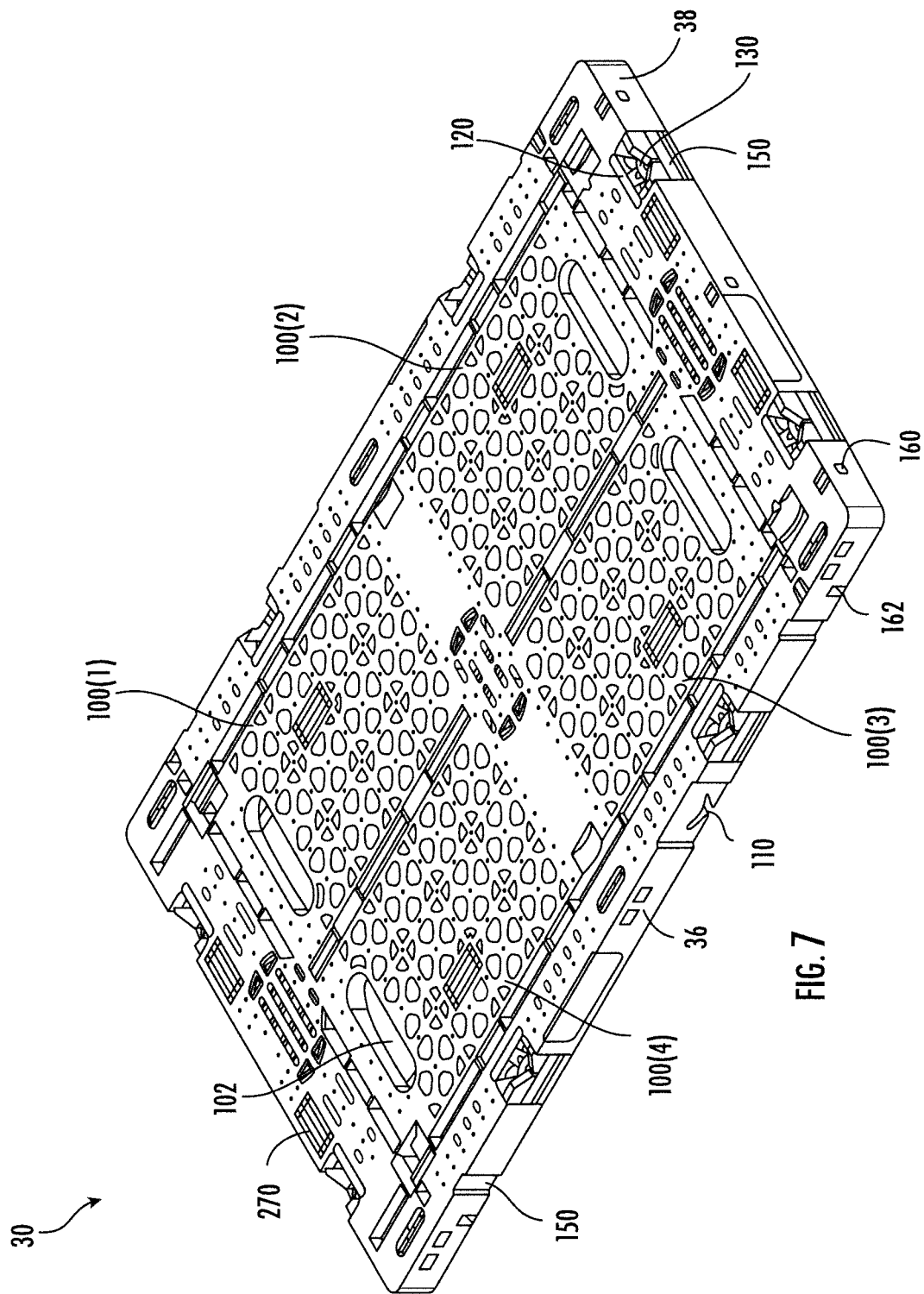
FIG. 7 is a top perspective view of the top deck shown in FIG. 1.

The top deck 30 also includes openings 160, 162 for receiving reinforcement bars, as illustrated in FIG. 7. The reinforcement bars add strength and durability to the top deck 30. The reinforcement bars may be, but are not limited to, steel or metal, for example. Sides 38 have three openings 160 and sides 36 have two openings 162 for receiving the reinforcement bars. After a reinforcement bar has been inserted into an opening 160, 162, a plug 45 as shown in FIG. 6 is inserted into the opening 160, 162 to retain the reinforcement bar. The openings 160, 162 may be sized to receive a ½ inch or ⅝ inch plug 45, for example.

As noted above, the half-size plastic pallet 20 is repairable. The pallet support legs 40 are formed separate from the top deck 30, with the top deck 30 being detachable from the pallet support legs 40 for pallet repair. Each support leg 40 includes snaps 54, 56 associated with the outer base support elements 52 and snaps 74 associated with center base support element 72. The respective snaps 54, 56 and 74 secure each pallet support leg 40 to the underside 34 of the top deck 30.

The snaps 74 associated with the center base support element 72 are secured to corresponding snap openings 180 exposed from the underside 34 of the top deck 30. Similarly, snaps 54, 56 associated with the outer base support elements 50 are secured to corresponding snap openings 170 exposed from the underside 34 of the top deck 30. The outer facing snap pins 52 are visible from the sides 36 of the top deck 30.

The product support surface 32 of the top deck 30 includes openings for receiving a jig used to remove a pallet support leg 40. The jig allows contact to be made with all of the snaps 54, 56, 74 on a pallet support leg 40 so as to un-snap them from the underside 34 of the top deck 30.

Figure 11:
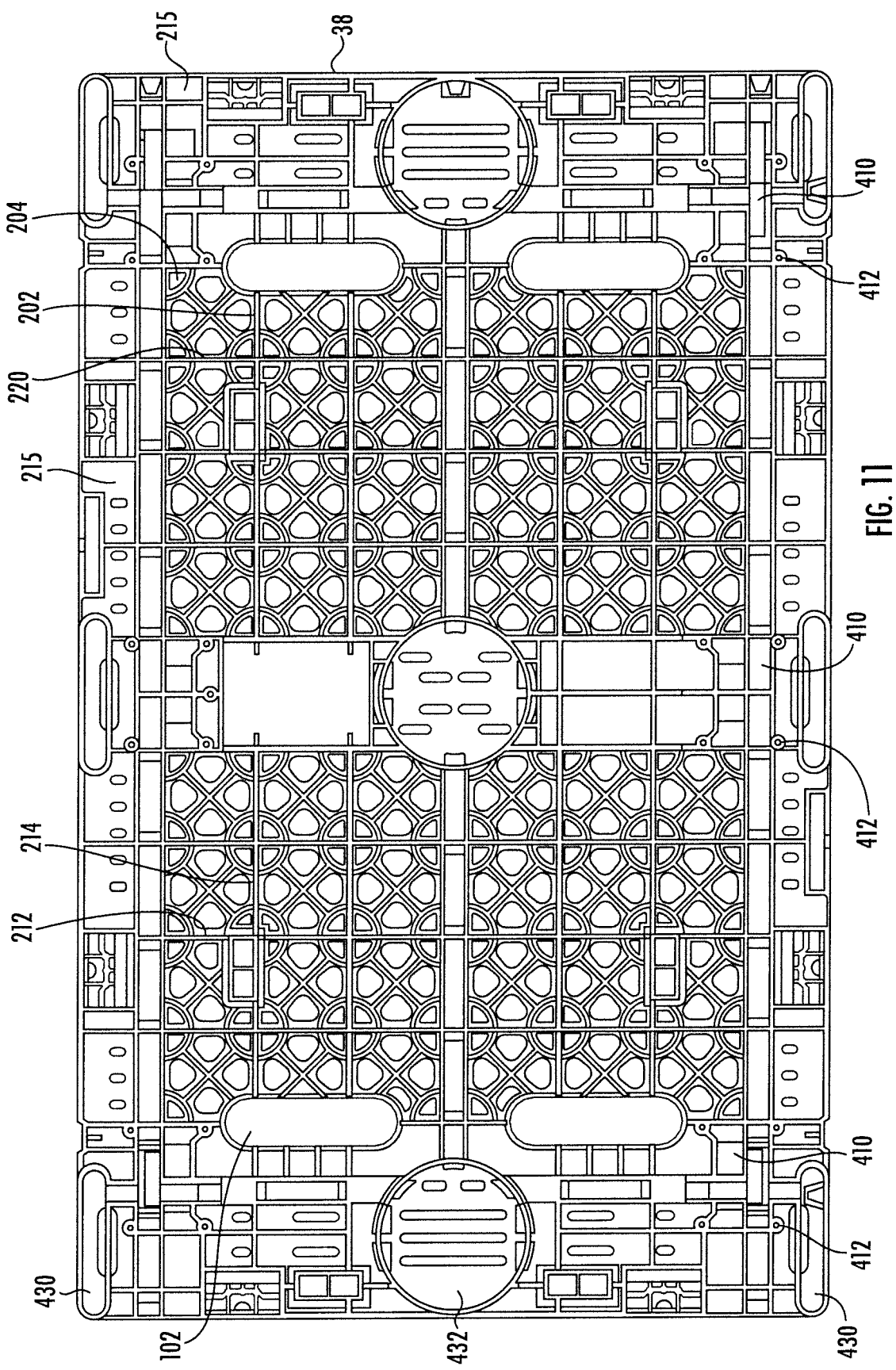
FIG. 11 is a bottom view of the top deck shown in FIG. 7.
Figure 12:
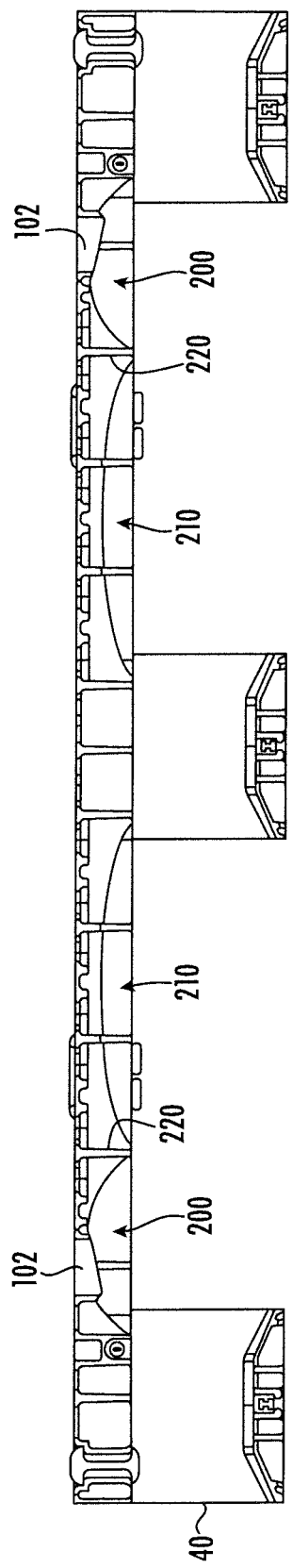
FIG. 12 is a cross-sectional side view of the top deck shown in FIG. 7.
Figure 13:
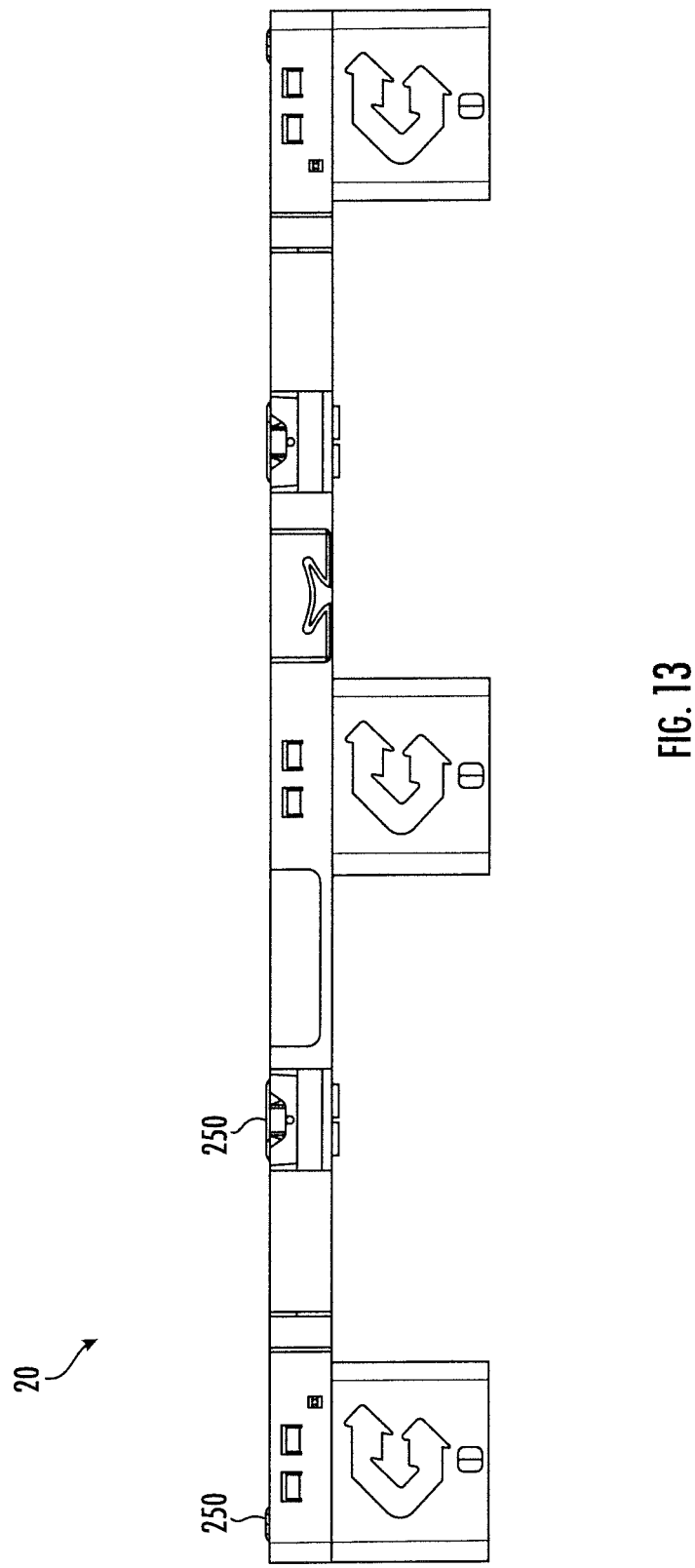
FIG. 13 is a side view of the half-size plastic pallet shown in FIG. 1.
Figure 14:
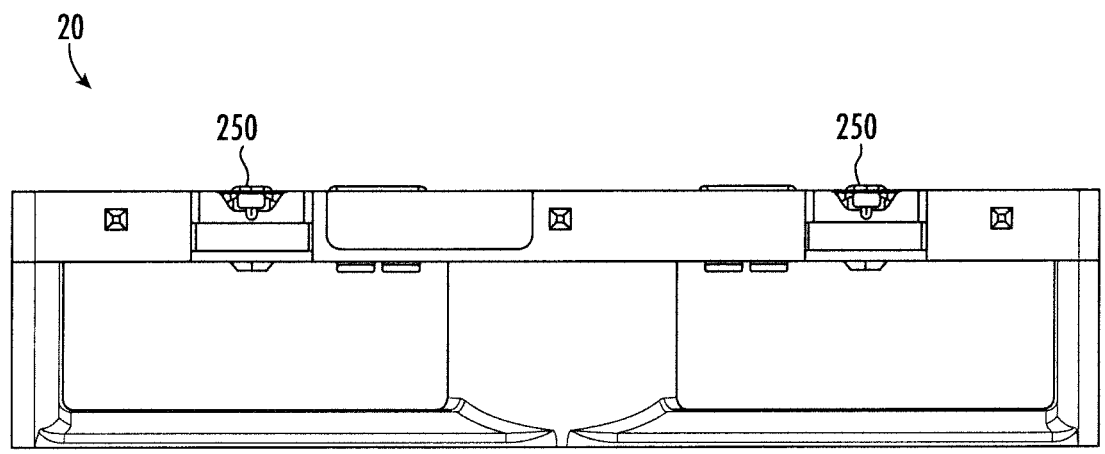
FIG. 14 is an end view of the half-size plastic pallet shown in FIG. 13.

Referring now to FIGS. 10-12, the four nearly symmetrical quadrants 100 will be discussed in greater detail. Each quadrant 100 includes a pair of spherical carvings 200, 210. The spherical carvings 200, 210 may also be referred to as deck scoop areas. The spherical carvings 200, 210 respectively reduce the thickness of the top deck 30 within each quadrant 100. The spherical carvings 200, 210 advantageously reduce the influence of center quadrant deflection on a fork tine's ability to pass through the opening below the top deck 30. Center quadrant deflection may occur at times when the load on the half-size plastic pallet 20 is heavy.

In other embodiments, each quadrant 100 may include a single spherical carving, such as spherical carving 200 or 210. In yet other embodiments, the single spherical carving may partially overlap between spherical carving 200 or 210.

Spherical carving 200 may be referred to as a first deck scoop area, and spherical carving 210 may be referred to as a second deck scoop area. The second deck scoop area 210 is larger in size than the first deck scoop area 200. The first deck scoop area 200 has a rectangular shape, and the second deck scoop area 210 has a square shape.

The underside 34 of the top deck 30 is made up of ribs that are exposed. The first deck scoop area 200 includes a respective hand access hole 102. The hand access hole 102 is centered within the first deck scoop area 200. The hand access hole 102 is at a peak of the curvature within the first deck scoop area 200. This peak corresponds to the minimum thickness point of the top deck 30 within the first deck scoop area 200.

The hand access hole 102 includes a wall 103 that extends from the product support surface 32 to the opposing underside 34 of the top deck 30. Exposed ribs 202 extend in a first direction, and exposed ribs 204 extend in a second direction orthogonal to the first direction within the first deck scoop area 200.

The first deck scoop area 200 in each quadrant 100 is adjacent an outer side 38 of the top deck 30. An outer perimeter area 215 of the quadrant 100 between the outer side 38 and the first deck scoop area 200 has a uniform thickness, and is not part of the first deck scoop area 200. The outer perimeter area 215 of the quadrant 100 extends around a perimeter of the top deck 30 for all four quadrants. The perimeter area is adjacent outer sides 36 and 38.

The second deck scoop area 210 is separated from the first spherical carving 200 by a transition wall 220. A thickness of the top deck 30 is not reduced at the transition wall 220. The ribs within the second deck scoop area 210 include ribs 212 extending in a first direction and ribs 214 extending in a second direction orthogonal to the first direction.

Figure 8:
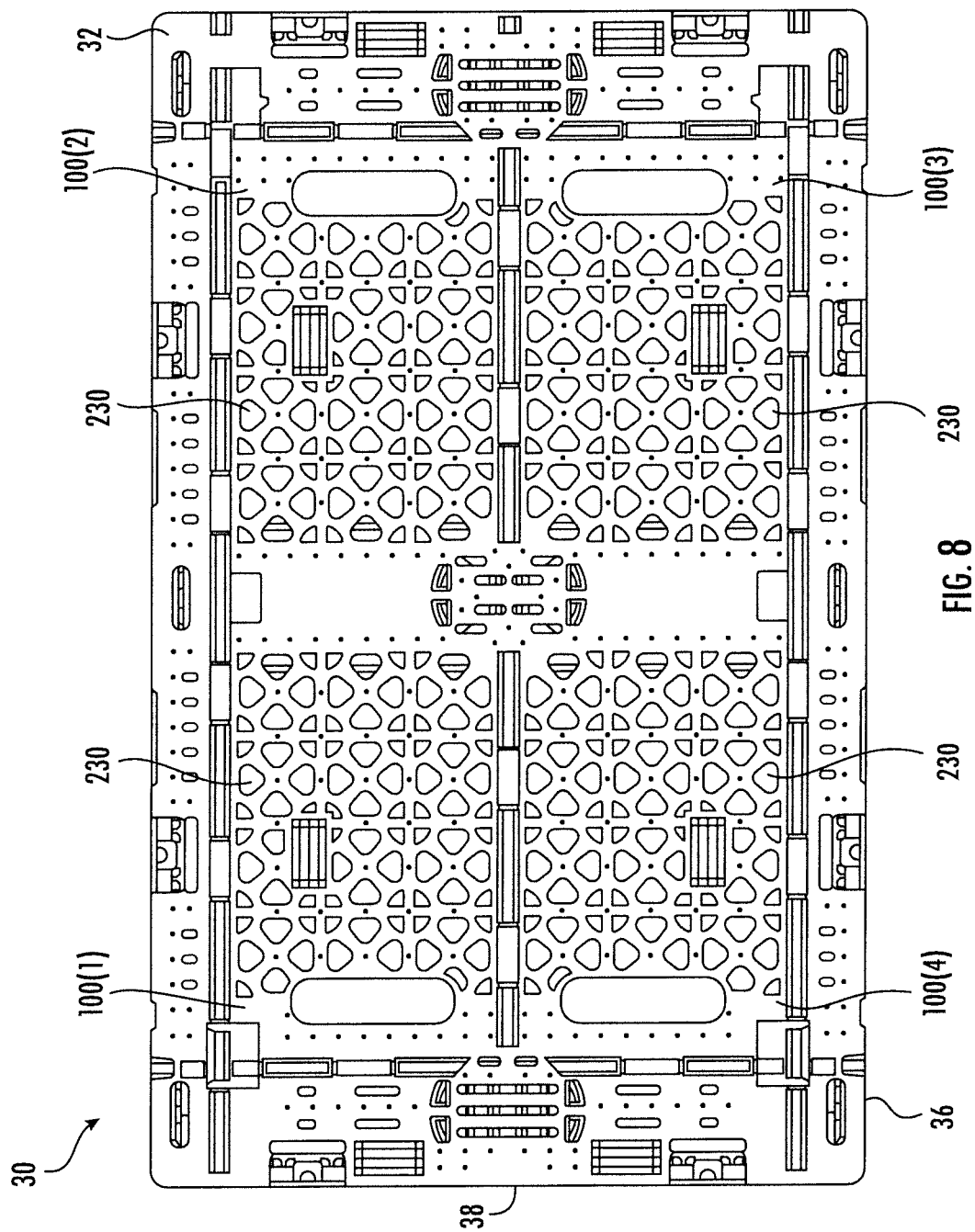
FIG. 8 is a top view of the top deck shown in FIG. 7.

The second deck scoop area 210 includes a plurality of spaced apart openings 230 in each quadrant 100, as illustrated in FIG. 8. The openings 230 extend to the underside 34 of the top deck 30. The openings 230 may be divided into spaced apart opening sections that are laid out in a grid pattern. Each opening section has a pattern of openings 230 that is symmetrical to each of the other opening sections within each second deck scoop area 210.

Another aspect is directed to a method for making a pallet 20 with deck scoop areas 200, 210 as described above. The method includes forming a top deck 30 that is divided into quadrants 100, and forming a plurality of pallet support legs 40. The pallet support legs 40 are coupled to an underside 34 of the top deck 30 and forming an opening below the top deck 30 for receiving a lifting member. The top deck 30 is formed to include at least one deck scoop area 200, 210 on an underside 34 thereof in each quadrant 100. A thickness of the top deck 30 is reduced in each deck scoop area 200, 210 to reduce influence of top deck deflection on ability of the lifting member to pass through the opening between below top deck 30.

The top deck 30 may be further configured with provisions to enable attachment of an electronic tracking device. A compartment, for example, may be formed or attached to an underside 34 of the top deck 30 to carry the electronic tracking device. Fasteners may be used for the attachment, including screws or other hardware, plastic clips, or a combination thereof. The electronic tracking device may be configured to store data during pallet use. The electronic tracking device may include, but is not limited to, communication protocols such as Bluetooth, Bluetooth Low Energy (BLE), RFID, cellular, and GPS.

Referring now to FIGS. 13-21, the use of grommets 250 within the top deck 30 will be discussed. The grommets 250 advantageously provide a better grip when items are placed on the product support surface 32 of the top deck 30, and provide a better grip with forklift tines on an underside 34 of the top deck 30. The grommets 250 also advantageously help to hold an identical half-size plastic pallet 20 in place when stacked on another half-size plastic pallet 20. Suitable materials for the grommets 250 include natural rubber and synthetic rubber, for example.

Each quadrant 100 has a pair of grommets 250. One of the grommets 250 is in the outer perimeter area 215 of the top deck 30. The other grommet 250 is within the second deck scoop area 210 and is orthogonal to the grommet 250 in the outer perimeter area 215. In the illustrated embodiment, there are eight grommets 250. The number, location and size of the grommets 250 may vary as readily appreciated by those skilled in the art.

Figure 15:
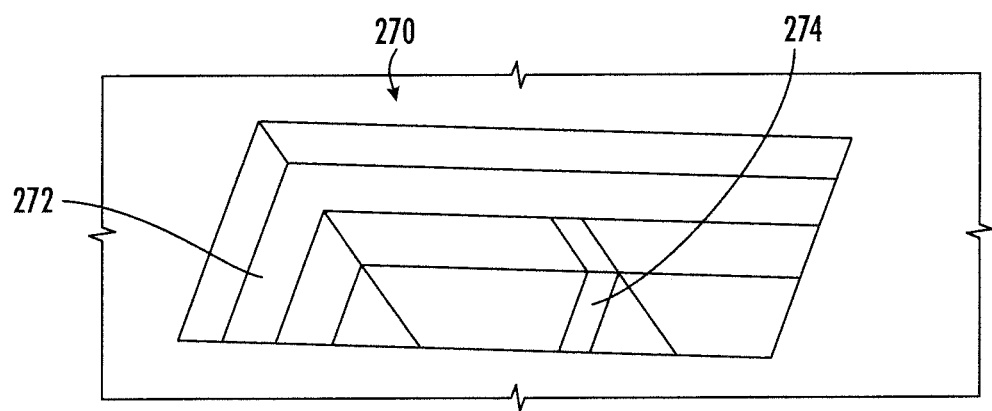
FIG. 15 is an isolated view of a grommet opening within the top deck shown in FIG. 7.
Figure 16:
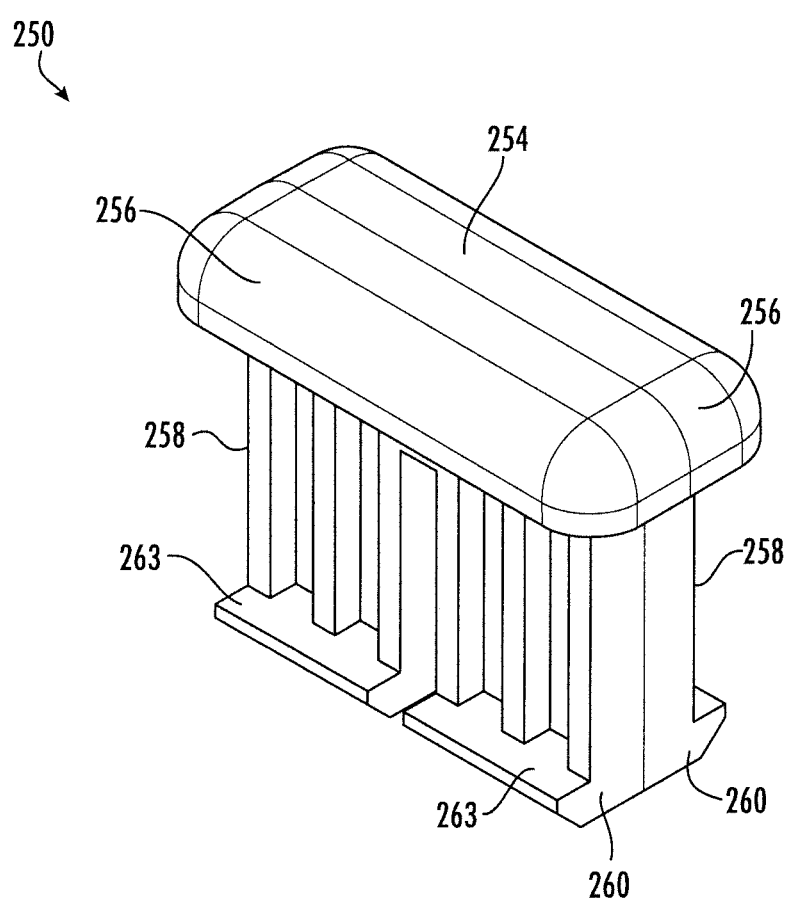
FIGS. 16-21 are various views of the grommet shown in FIGS. 13-14.
Figure 17:
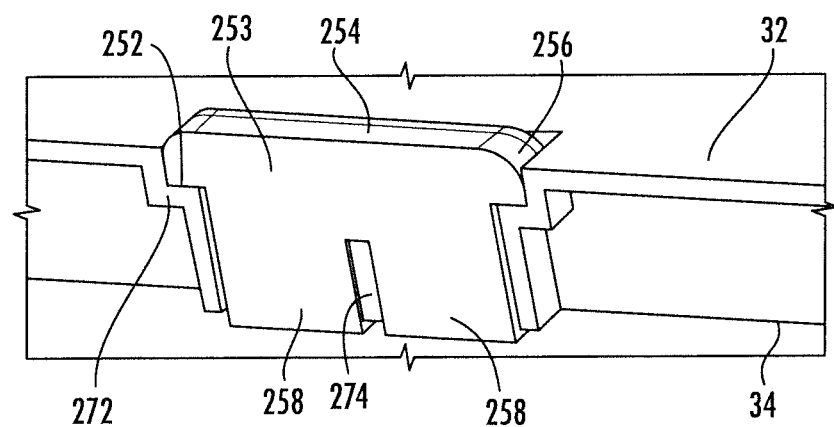
Figure 18:
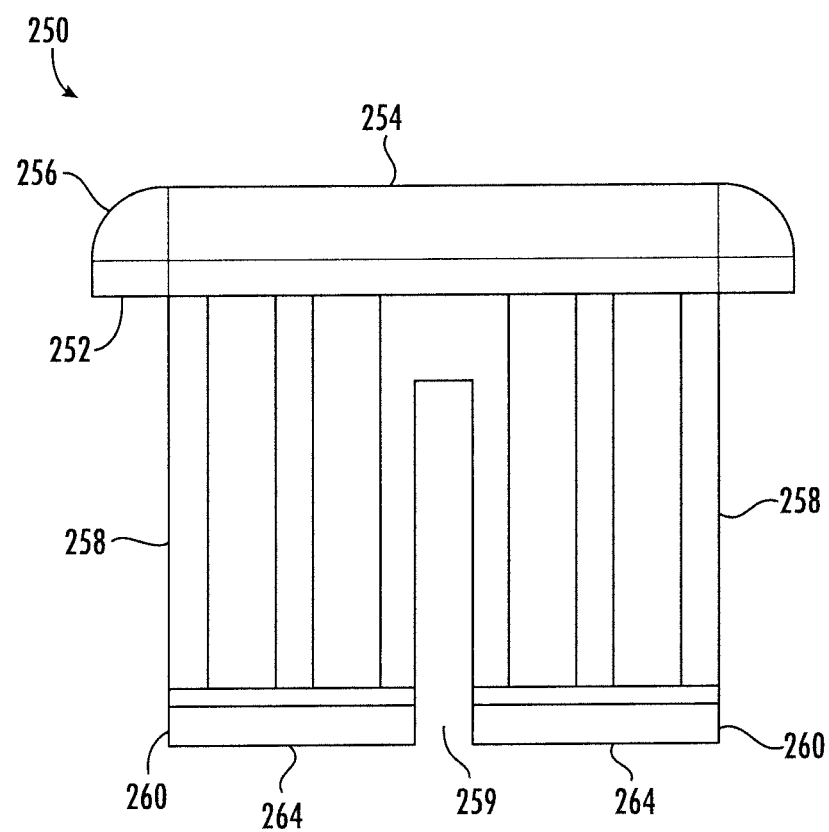

Each grommet 250 is inserted into a rectangular shaped grommet opening 270 that extends through the top deck 30, as illustrated in FIG. 15. The grommet opening 270 is stepped down from the upper surface 32 of the top deck 30 to form a recessed shelf 272. The grommet opening 270 has a first perimeter size above the recessed shelf 272.

Below the recessed shelf the opening 270 has a second perimeter size that is less than the first perimeter size. Included within the second perimeter size is a divider 274. An upper surface of the divider 274 is recessed from the recessed shelf 272, and a lower surface of the divider 274 continues to the underside 34 of the top deck 30. The divider 274 requires that a lower portion of each grommet 250 have a slit or gap 259 so as to accommodate the divider 274.

Each grommet 250 includes an upper section 253 that includes an upper lip 252 for engaging or resting on the recessed shelf 272. An upper surface 254 of each grommet 250 is flat and elevated above the product support surface 32 of the top deck 30. The transition 256 between the upper surface 254 and the upper lip 252 of each corresponding grommet 250 is curved.

Figure 19:
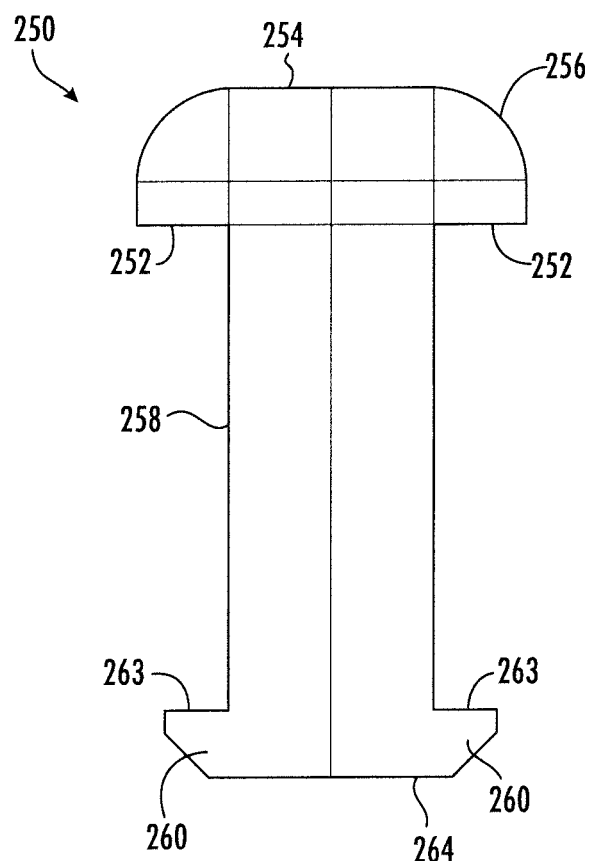
Figure 20:
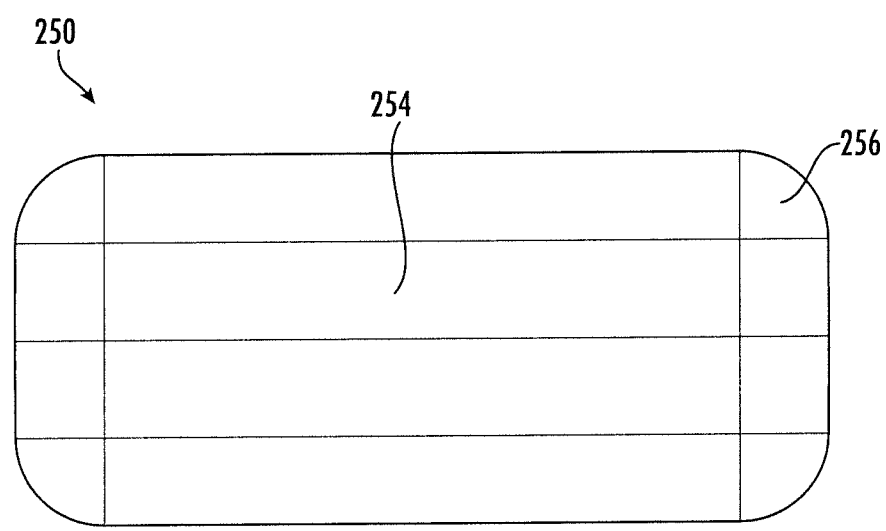
Figure 21:
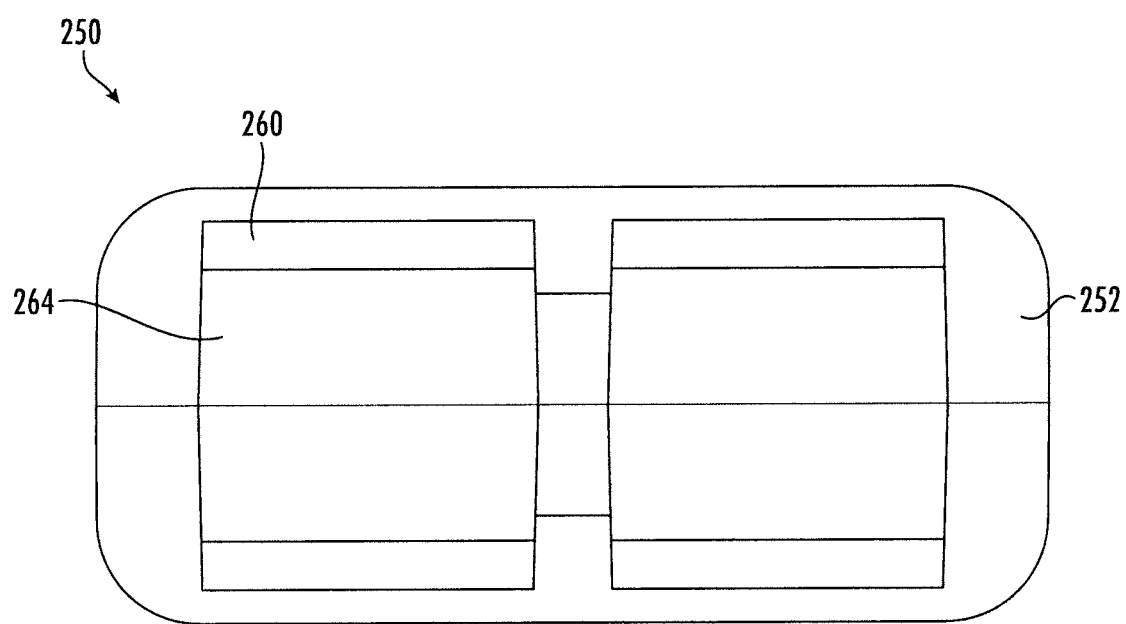

A pair of mid-sections 258 extend from the upper section 253 of each grommet 250. The mid-sections 258 are on adjacent sides of the divider 274. A respective lower section 260 extends from each mid-section 258. The lower section 260 extends through to the underside 34 of the top deck 30 and is flared for engaging the underside 34 of the top deck 30, as illustrated in FIG. 19. Each lower section 260 includes a lower lip 263 that is to engage or rest on the underside 34 of the top deck 30.

In addition to the grommets 250, the product support surface 32 of the top deck 30 includes an array of frictional points 290 to prevent slippage of products on the product support surface 32, as illustrated in FIG. 9. Each frictional point 290 has a circular shape and is in the form of a raised stub, for example. To reduce the weight and amount of material needed to form a half-size plastic pallet 20, the top deck 30 and the pallet support legs 40 include a number of spaced apart openings 230 as discussed above.

Another aspect is directed to a method for making a pallet 20 with grommets 250 as described above. The method comprises forming a top deck 30 having a plurality of grommet openings 270 extending therethrough, with each grommet opening 270 including a recessed shelf 272. A plurality of grommets 250 is inserted into the plurality of grommet openings 270. Each grommet 250 comprises an upper section 253 comprising an upper lip 252 resting on the recessed shelf 272, and an outer exposed surface 254 of the upper section 253 extending in height above the top deck 30. At least one mid-section 258 is adjacent the upper lip 252 and extends from the upper section 253 to an underside 34 of the top deck 30. At least one lower section 260 extends from the at least one mid-section 258, and comprises a pair of spaced apart lower lips 263 resting on the underside 34 of the top deck 30. An outer exposed surface 264 of the at least one lower section 260 extends in height below the underside 34 of the top deck 30. The method further comprises forming a plurality of pallet support legs 40, and coupling the plurality of pallet support legs 40 to an underside 34 of the top deck 30 and forming an opening below the top deck 30 for receiving a lifting member.

Figure 22:
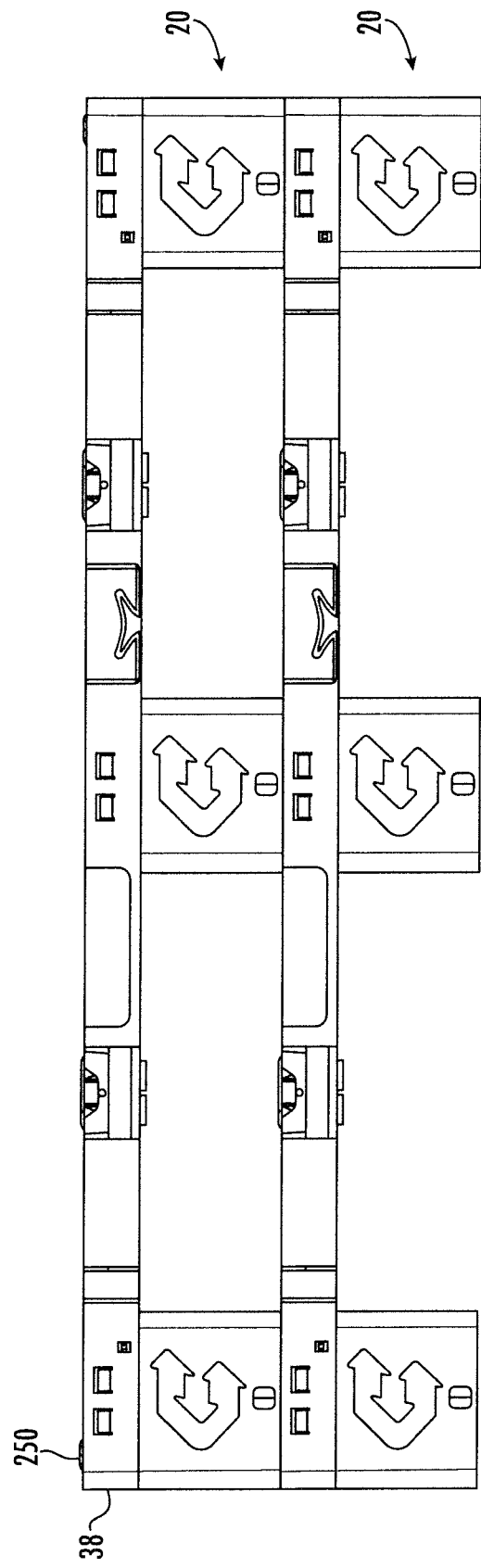
FIG. 22 is a side view of the half-size plastic pallet shown in FIG. 1 stacked with another half-size plastic pallet.
Figure 23:
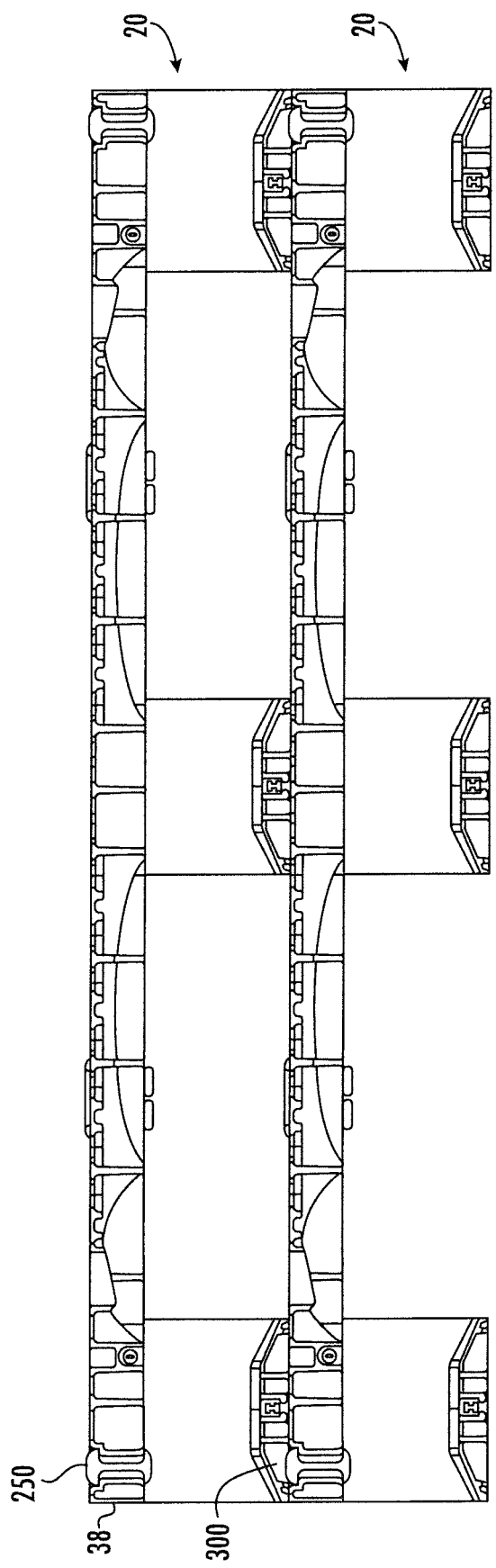
FIG. 23 is a cross-sectional side view of the stacked half-size plastic pallets shown in FIG. 22.
Figure 24:
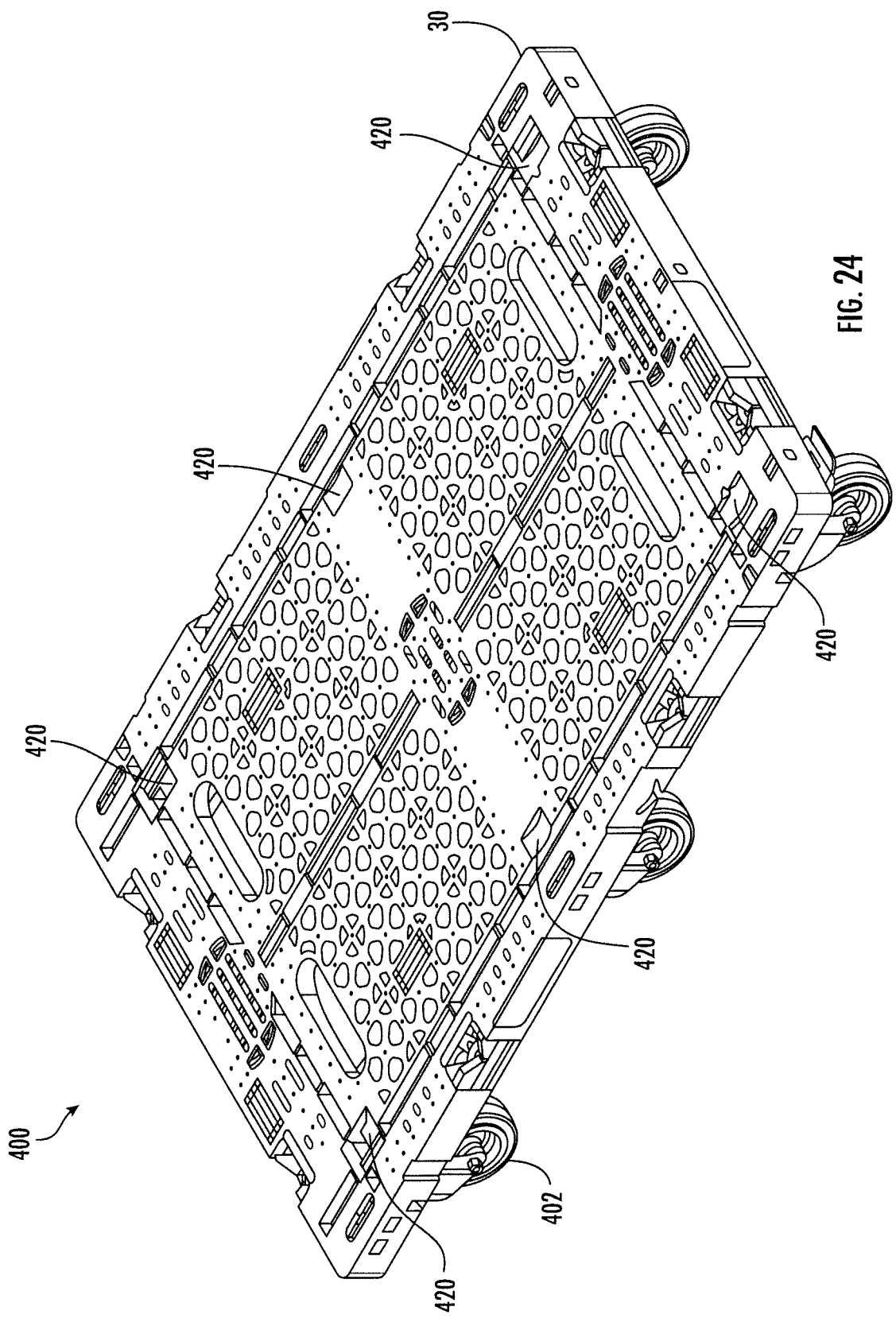
FIG. 24 is an upper perspective view of the top deck shown in FIG. 7 configured as a dolly.
Figure 25:
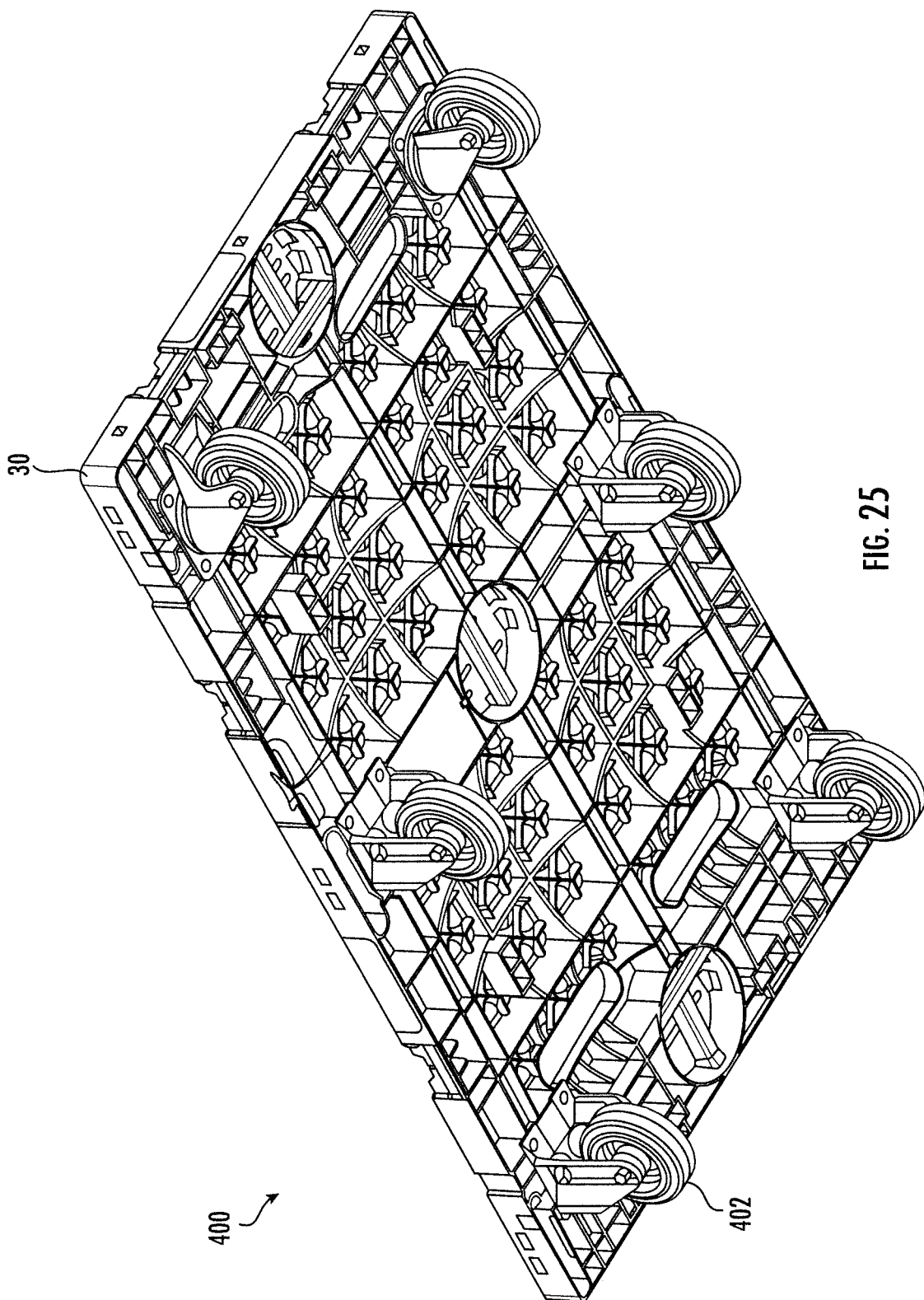
FIG. 25 is a bottom perspective view of the dolly shown in FIG. 24.
Figure 26:
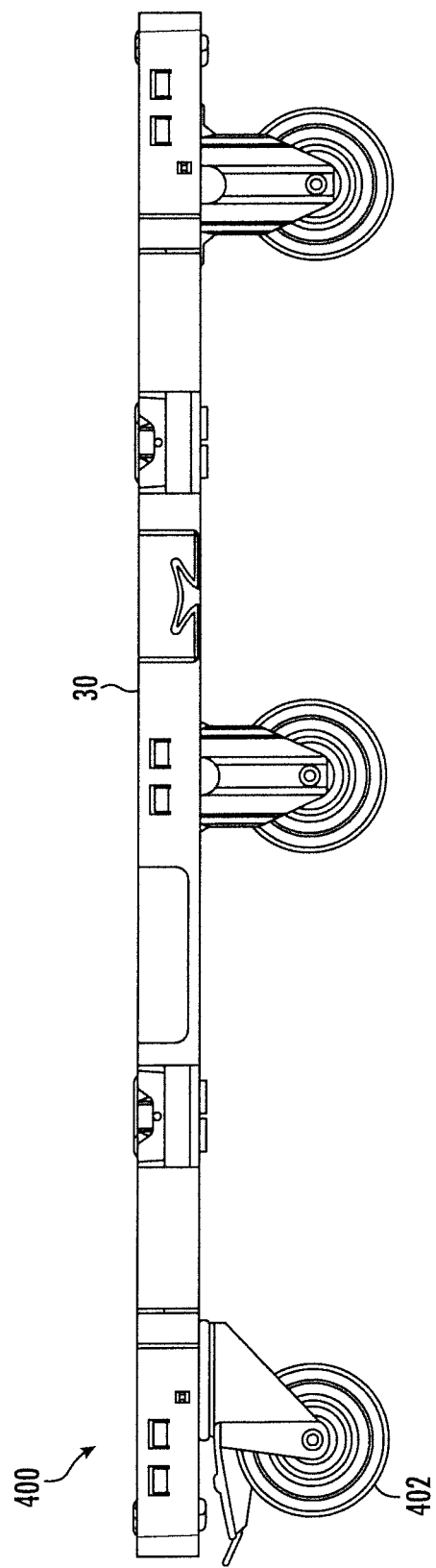
FIG. 26 is a side view of the dolly shown in FIG. 24.
Figure 27:
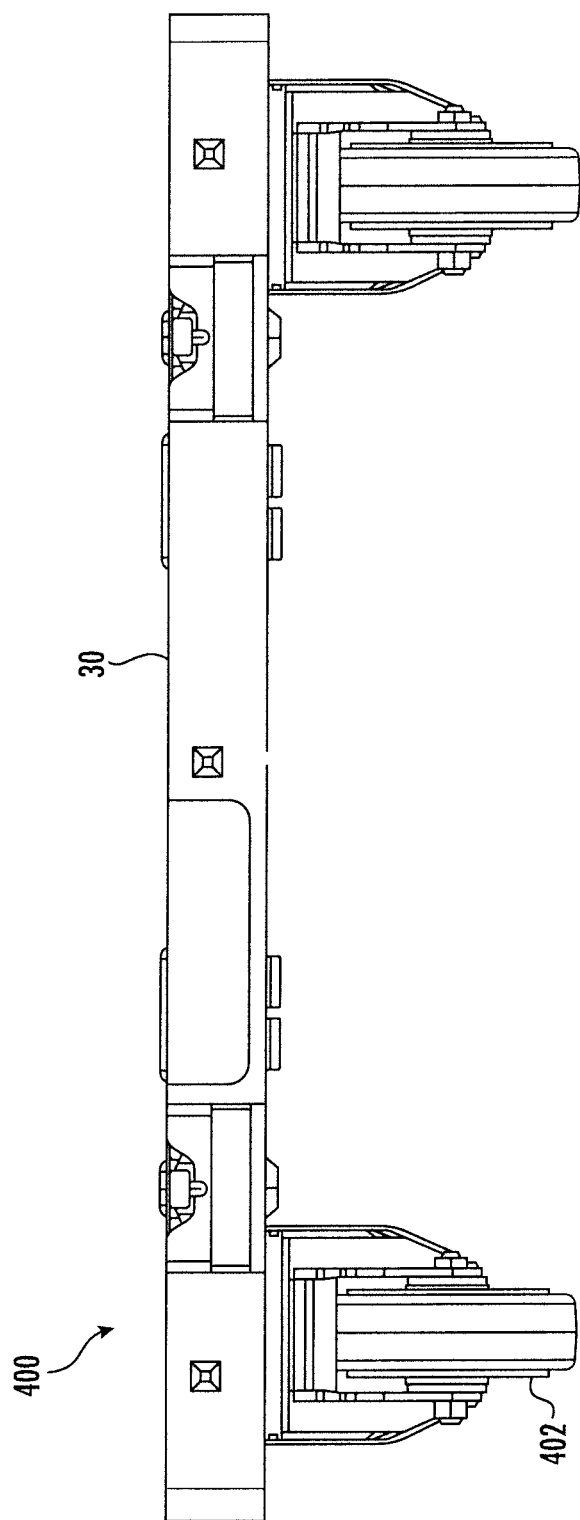
FIG. 27 is an end view of the dolly shown in FIG. 24.
Figure 28:
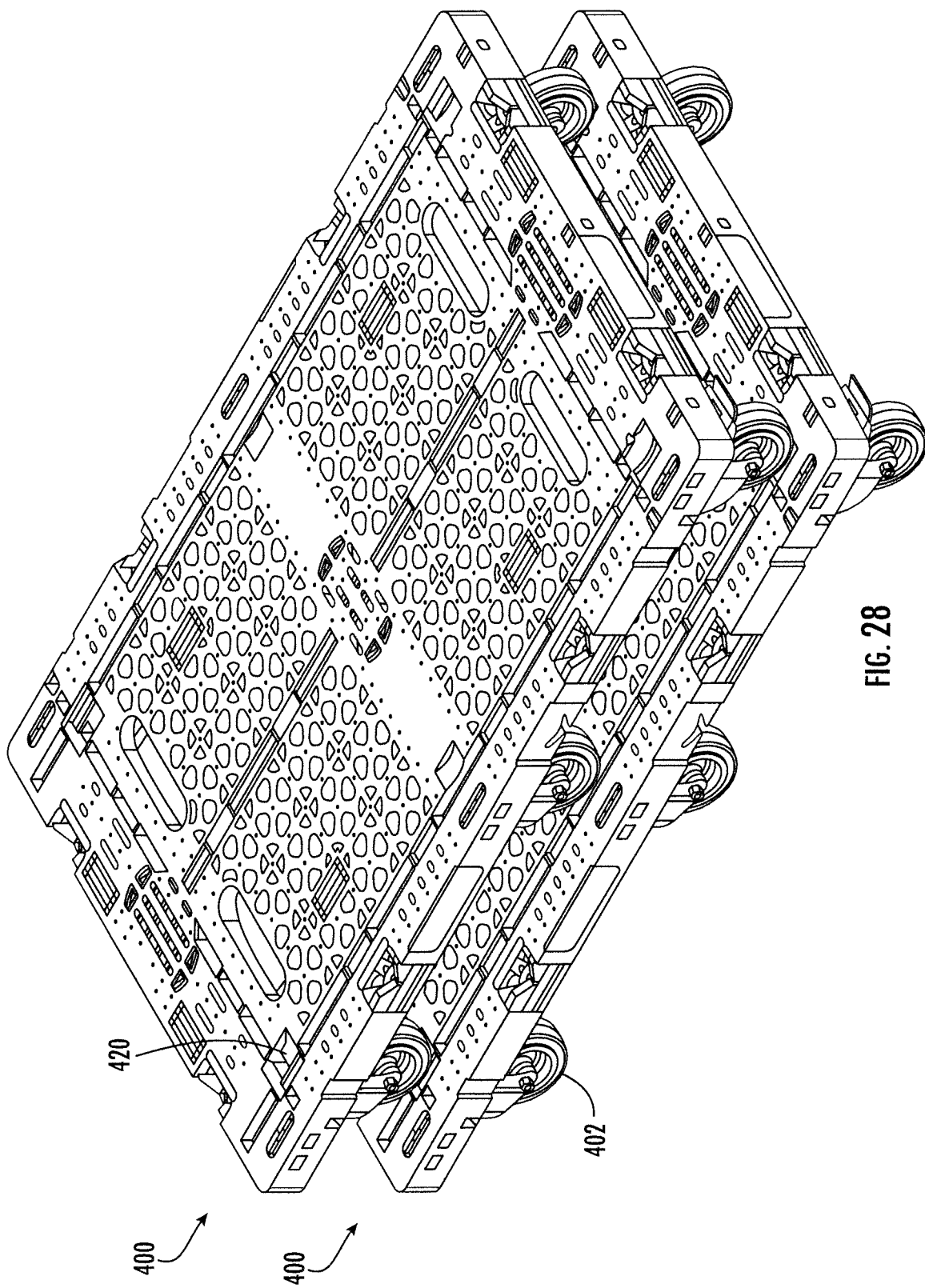
FIG. 28 is an upper perspective view of the dolly shown in FIG. 24 stacked with another dolly.
Figure 29:
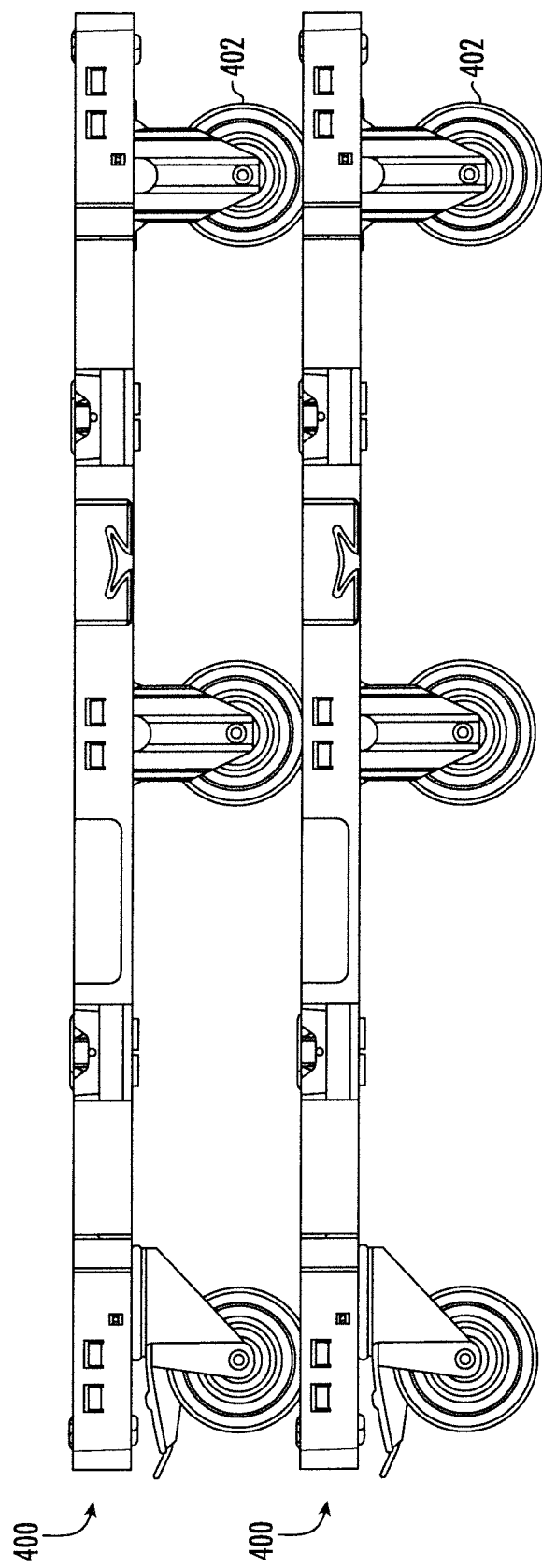
FIG. 29 is a side view of the stacked dollies shown in FIG. 28.

Referring now to FIGS. 22 and 23, the half-size plastic pallet 20 is stackable with other identical half-size plastic pallets 20. The grommets 250 adjacent the outer sides 38 of the top deck 30 help to hold a stacked half-size plastic pallet 20 in place. This is accomplished with the upper surface 254 of the grommets 250 being elevated above the upper product support surface 32 of the top deck 30. The elevated upper surface 254 of the grommets 250 above the product support surface 32 of the top deck 30 may be within a range of 0.25 to 0.75 inches, for example. This range is not to be limiting since the actual elevated upper surface 254 may vary outside of this range.

A pair of corresponding openings 300 is in an underside of the pallet support legs 40 for engaging with the upper surface 254 of the grommets 250 of the stacked pallet 20, as illustrated in FIG. 23 by a cross-sectional view of the stacked half-size plastic pallets 20. Each opening 300 is sized to receive the upper section 253 of a grommet 250, which includes the upper surface 254 as well as a portion of the transition 256 between the upper surface 254 and the upper lip 252.

In particular, the pallet 20 comprises a top deck 30 including a product support surface 32 and an opposing underside 34. The product support surface 32 has a plurality of grommet openings 270 extending therethrough, with each grommet opening 270 including a recessed shelf 272.

A plurality of grommets 250 is inserted into the plurality of grommet openings 270. Each grommet 250 comprises an upper section 253 comprising an upper lip 252 resting on the recessed shelf 272, and an outer exposed surface 254 of the upper section 253 extends in height above the top deck 30.

A plurality of pallet support legs 40 are on the underside 34 of the top deck and is aligned with the plurality of grommets 250 adjacent the outer sides 38 of the top deck 30. Each pallet support leg 40 includes a base 42 extending across a width of the top deck 30, and a pair of outer base support elements 52. Each outer base support element 52 has a lower end integrally formed with an end of the base 42, and an upper end coupled to the underside 34 of the top deck 30. An underside of the base 42 is configured to engage the upper sections 253 of a pair of grommets 250 of an identical pallet 20 when stacked thereon.

Figure 5:
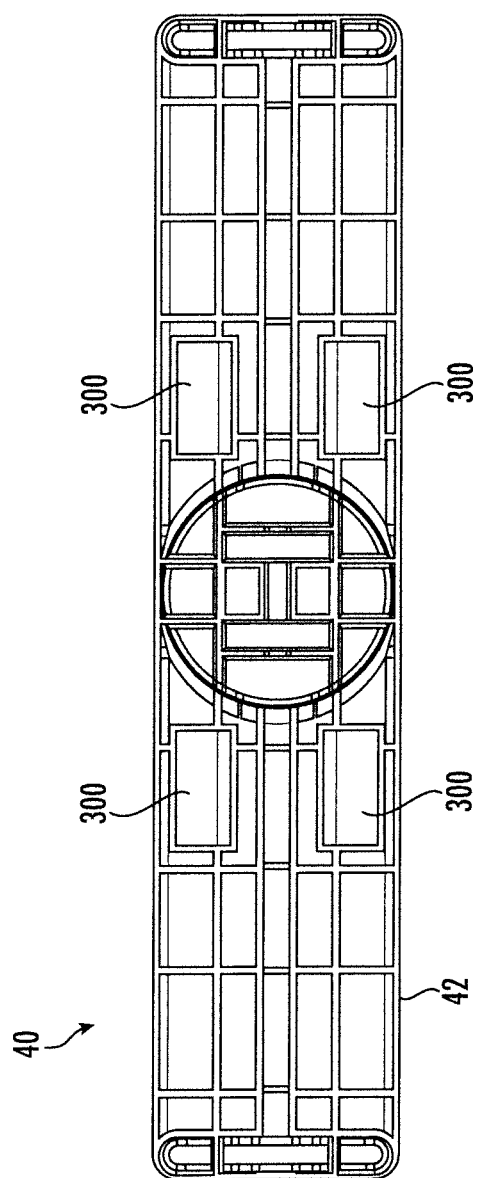
FIG. 5 is a bottom view of the pallet support leg shown in FIGS. 1 and 2.

The underside 34 of the base 42 includes a plurality of grommet openings 300, as illustrated in FIG. 5. Each grommet opening 300 is configured to receive the upper section 253 of a respective grommet 250 of the identical pallet 20 when stacked thereon. There are four grommet openings 300 in the base 42 so that the outer pallet support legs 40 can be coupled to the top deck 30 without being limited to placement adjacent a particular outer side 38 of the top deck 30.

The upper section 253 of each grommet 250 includes an upper surface 254, with a transition 256 between the upper surface 254 and the upper lip 252 being curved. The curved transition 256 acts as a guide for positioning the upper surface 254 of the upper section 253 of the grommet 250 into a corresponding opening 300 in the base 42 of the pallet support legs 40. The plurality of grommet openings 270 are positioned at opposing outer sides 38 of the top deck 30, with each opposing outer side 38 having a pair of spaced apart grommet openings 270.

Another aspect is directed to making a pallet 20 that is stackable with other identical pallets 20 as described above. The method comprises forming a top deck 30 including a product support surface 32 and an opposing underside 34. The product support surface 32 has a plurality of grommet openings 270 extending therethrough, with each grommet opening 270 including a recessed shelf 272.

The method further includes inserting a plurality of grommets 250 into the plurality of grommet openings 270. Each grommet 250 comprises an upper section 253 comprising an upper lip 252 resting on the recessed shelf 272. An outer exposed surface 254 of the upper section 253 extends in height above the top deck 30.

The method further includes forming a plurality of pallet support legs 40. Each pallet support leg 40 includes a base 42 extending across a width of the top deck 30, and a pair of outer base support elements 52. Each outer base support element 52 has a lower end integrally formed with an end of the base 42, and an upper end coupled to the underside 34 of the top deck 30. An underside of the base 42 is configured to engage the upper sections 253 of a pair of grommets 250 of an identical pallet 20 when stacked thereon. The plurality of support legs 40 is coupled to the underside 34 of the top deck 30, with the plurality of support legs 40 being aligned with the plurality of grommets 250.

Another feature of the top deck 30 is that it may be reconfigurable as a pallet/dolly platform 30. A dolly 400 is formed with the addition of dolly wheels 402 to the reconfigurable pallet/dolly platform 30, as illustrated in FIGS. 24-29. The reconfigurable pallet/dolly platform 30 is advantageously reconfigured to support a half-size plastic pallet 20 or a half-size dolly 400.

When the reconfigurable pallet/dolly platform 30 is configured as a dolly 400, the pallet support legs 40 are not coupled to the underside 34 of the platform 30. Likewise, when the reconfigurable pallet/dolly platform 30 is configured as a pallet 20, the dolly wheels 402 are not coupled to the underside 34 of the platform 30.

Referring back to FIG. 11 illustrating the underside 34 of the top deck 30, a plurality of dolly wheel attachment areas 410 is provided for receiving a plurality of dolly wheels 402 when configured as a dolly 400. There are six dolly wheels 402 coupled to the underside 34 of the top deck 30, with three on each side 36. Each dolly wheel attachment area 410 includes four attachment points 412 for securing a dolly wheel 402. An additional attachment point may be provided to receive a cover when the top deck 30 is being used as a pallet.

In the product support surface 32 of the reconfigurable pallet/dolly platform 30, a plurality of dolly wheel wells 420 is provided. The plurality of dolly wheel wells 420 is aligned with the plurality of dolly wheel receiving areas 410. Each dolly wheel well 420 is configured to engage a respective dolly wheel 402 from an identical dolly 400 stacked thereon. By having the dolly wheel wells 420 receiving the dolly wheels 402 from a stacked dolly 400, stability is provided as the stacked dollies 400 are moved.

In addition, each dolly wheel well 420 may include a drainage opening so that water or other liquids do not accumulate. The dolly wheels 402 at one end of the dolly 400 can swivel about an axis perpendicular to the top deck 30, whereas the other four dolly wheels 402 do not swivel.

In particular, the reconfigurable pallet/dolly platform 30 comprises a top deck 30 including a product support surface 32 and an opposing underside 34. The product support surface 32 has a plurality of grommet openings 270 extending therethrough, with each grommet opening 270 including a recessed shelf 272.

The underside 34 includes a plurality of pallet support leg attachment areas 430, 432 aligned with the plurality of grommet openings 270, and for receiving a plurality of pallet support legs 40 when configured as a pallet 20. A plurality of dolly wheel attachment areas 410 is for receiving a plurality of dolly wheels 402 when configured as a dolly 400.

The product support surface 32 includes a plurality of grommets 270 inserted into the plurality of grommet openings 250. Each grommet 270 comprises an upper section 253 comprising an upper lip 252 resting on the recessed shelf 272. An outer exposed surface 254 of the upper section 253 extends in height above the top deck, and is configured to engage an underside 300 of the pallet support legs 40 from an identical platform 30 stacked thereon when configured as a pallet 20.

A plurality of dolly wheel receiving areas 410 is aligned with the plurality of dolly wheel wells 420, and is configured to engage the plurality of dolly wheels 402 from an identical platform 30 stacked thereon when configured as a dolly 400.

The underside of each pallet support leg 40 includes a plurality of grommet openings 300, with each grommet opening 300 configured to receive the upper section 254 of a respective grommet 250 of the identical pallet 20 when stacked thereon.

Another aspect is directed to making a reconfigurable pallet/dolly platform 30 comprising forming a top deck 30 including a product support surface 32 and an opposing underside 34. The product support surface 32 has a plurality of grommet openings 270 extending therethrough, with each grommet opening 270 including a recessed shelf 272.

The underside 34 includes a plurality of pallet support leg attachment areas 430, 432 aligned with the plurality of grommet openings 270, and is for receiving a plurality of pallet support legs 40 when configured as a pallet 20. A plurality of dolly wheel attachment areas 410 is for receiving a plurality of dolly wheels 402 when configured as a dolly 400.

The product support surface 32 includes a plurality of grommets 270 inserted into the plurality of grommet openings 250. Each grommet 270 comprises an upper section 253 comprising an upper lip 252 resting on the recessed shelf 272. An outer exposed surface 254 of the upper section 253 extends in height above the top deck, and is configured to engage an underside 300 of the pallet support legs 40 from an identical platform 30 stacked thereon when configured as a pallet 20.

A plurality of dolly wheel receiving areas 410 is aligned with the plurality of dolly wheel wells 420, and is configured to engage the plurality of dolly wheels 402 from an identical platform 30 stacked thereon when configured as a dolly 400.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A reconfigurable pallet/dolly platform comprising:
   a top deck including a product support surface and an opposing underside, and with the product support surface having a plurality of grommet openings extending therethrough, with each grommet opening including a recessed shelf extending along an entirety of a perimeter of each respective grommet opening;
   with the underside including:
      a plurality of pallet support leg attachment areas aligned with the plurality of grommet openings and for receiving a plurality of pallet support legs when configured as a pallet, and
      a plurality of dolly wheel attachment areas for receiving a plurality of dolly wheels when configured as a dolly; and
   with the product support surface including:
      a plurality of grommets inserted into the plurality of grommet openings, each grommet comprising an upper section comprising an upper lip extending along the perimeter of each respective grommet opening and resting on the recessed shelf, and an outer exposed surface of said upper section extending in height above said top deck and configured to engage an underside of the pallet support legs from an identical platform stacked thereon when configured as a pallet, and
   a plurality of dolly wheel receiving areas aligned with the plurality of dolly wheel wells and configured to engage the plurality of dolly wheels from an identical platform stacked thereon when configured as a dolly.

2. The reconfigurable pallet/dolly platform according to claim 1 wherein the underside of each pallet support leg includes a plurality of grommet openings, with each grommet opening configured to receive the upper section of a respective grommet of the identical pallet when stacked thereon.

3. The reconfigurable pallet/dolly platform according to claim 1 wherein the upper section of each grommet includes an upper surface, with a transition between the upper surface and the upper lip being curved.

4. The reconfigurable pallet/dolly platform according to claim 1 wherein the plurality of grommet openings are positioned at opposing ends of said top deck, with each opposing end having a pair of spaced apart grommet openings with a pair of grommets inserted therein.

5. The reconfigurable pallet/dolly platform according to claim 4 wherein each pallet support leg comprises:
   a base extending across a width of said top deck;
   a pair of outer base support elements, with each outer base support element having a lower end integrally formed with an end of said base and an upper end coupled to the underside of said top deck; and
   with an underside of said base configured to engage the upper sections of a pair of grommets of an identical pallet when stacked thereon.

6. The reconfigurable pallet/dolly platform according to claim 5 wherein each pallet support leg further comprises a center base support element having a lower end integrally formed with the base and an upper end coupled to the underside of said top deck, and wherein each pair of spaced apart grommet openings include a respective grommet opening between the center base support element and each outer base support element.

7. The reconfigurable pallet/dolly platform according to claim 1 wherein each grommet further comprises:
   at least one mid-section adjacent the upper lip and extending from said upper section to an underside of said top deck; and
   at least one lower section extending from said at least one mid-section, and comprising a pair of spaced apart lower lips resting on the underside of said top deck, with an outer exposed surface of said at least one lower section extending in height below the underside of said top deck.

8. The reconfigurable pallet/dolly platform according to claim 7 wherein each grommet opening further includes a divider; wherein said at least one mid-section comprises a pair of spaced apart mid-sections, with each mid-section being separated by said divider; and wherein said at least one lower section comprises a pair of lower sections, with each lower section extending from a respective mid-section.

9. The reconfigurable pallet/dolly platform according to claim 8 wherein said divider includes a lower surface even with the underside of said top deck.

10. The reconfigurable pallet/dolly platform according to claim 8 wherein said divider includes an upper surface that is below the recessed shelf.

11. The reconfigurable pallet/dolly platform according to claim 1 wherein said top deck and plurality of pallet support legs comprise plastic.

12. A method for making a reconfigurable pallet/dolly platform comprising:

forming a top deck including a product support surface and an opposing underside, and with the product support surface having a plurality of grommet openings extending therethrough, with each grommet opening including a recessed shelf extending along an entirety of a perimeter of each respective grommet opening;

with the underside including:
a plurality of pallet support leg attachment areas aligned with the plurality of grommet openings and for receiving a plurality of pallet support legs when configured as a pallet, and
a plurality of dolly wheel attachment areas for receiving a plurality of dolly wheels when configured as a dolly; and with the product support surface including:
a plurality of grommets inserted into the plurality of grommet openings, each grommet comprising an upper section comprising an upper lip extending along the perimeter of each respective grommet opening and resting on the recessed shelf, and an outer exposed surface of the upper section extending in height above the top deck and configured to engage a recess on an underside of the pallet support legs from an identical platform stacked thereon when configured as a pallet, and an underside of the pallet support legs from an identical platform stacked thereon when configured as a pallet, and
a plurality of dolly wheel receiving areas aligned with the plurality of dolly wheel wells and configured to engage the plurality of dolly wheels from an identical platform stacked thereon when configured as a dolly.

13. The method according to claim 12 wherein the underside of each pallet support leg includes a plurality of grommet openings, with each grommet opening configured to receive the upper section of a respective grommet of the identical pallet when stacked thereon.

14. The method according to claim 12 wherein the upper section of each grommet includes an upper surface, with a transition between the upper surface and the upper lip being curved.

15. The method according to claim 12 wherein the plurality of grommet openings are positioned at opposing ends of the top deck, with each opposing end having a pair of spaced apart grommet openings with a pair of grommets inserted therein.

16. The method according to claim 15 wherein each pallet support leg comprises:
a base extending across a width of the top deck;
a pair of outer base support elements, with each outer base support element having a lower end integrally formed with an end of the base and an upper end coupled to the underside of the top deck; and
with an underside of the base configured to engage the upper sections of a pair of grommets of an identical pallet when stacked thereon.

17. The method according to claim 16 wherein each pallet support leg further comprises a center base support element having a lower end integrally formed with the base and an upper end coupled to the underside of the top deck, and wherein each pair of spaced apart grommet openings include a respective grommet opening between the center base support element and each outer base support element.

18. The method according to claim 12 wherein each grommet further comprises:
at least one mid-section adjacent the upper lip and extending from the upper section to an underside of the top deck; and
at least one lower section extending from the at least one mid-section, and comprising a pair of spaced apart lower lips resting on the underside of the top deck, with an outer exposed surface of the at least one lower section extending in height below the underside of the top deck.

19. The method according to claim 18 wherein each grommet opening further includes a divider; wherein the at least one mid-section comprises a pair of spaced apart mid-sections, with each mid-section being separated by the divider;
and wherein the at least one lower section comprises a pair of lower sections, with each lower section extending from a respective mid-section.

20. The method according to claim 12 wherein the top deck and plurality of pallet support legs comprise plastic.

* * * * *